(12) United States Patent
Moss et al.

(10) Patent No.: US 11,026,768 B2
(45) Date of Patent: Jun. 8, 2021

(54) DENTAL APPLIANCE REINFORCEMENT

(75) Inventors: Jon F. Moss, Antioch, CA (US); Lou Marzano, Palo Alto, CA (US); Eric E. Kuo, Foster City, CA (US); Kelsey D. Wirth, Cambridge, MA (US)

(73) Assignee: Align Technology, Inc., San Jose, CA (US)

( * ) Notice: Subject to any disclaimer, the term of this patent is extended or adjusted under 35 U.S.C. 154(b) by 746 days.

(21) Appl. No.: 12/152,188

(22) Filed: May 13, 2008

(65) Prior Publication Data

US 2008/0268400 A1 Oct. 30, 2008

(51) Int. Cl.
| A61C 7/08 | (2006.01) |
| A61C 9/00 | (2006.01) |
| A61C 7/00 | (2006.01) |
| A61C 13/00 | (2006.01) |

(52) U.S. Cl.
CPC ............. *A61C 7/08* (2013.01); *A61C 7/00* (2013.01); *A61C 9/00* (2013.01); *A61C 7/002* (2013.01); *A61C 13/0004* (2013.01)

(58) Field of Classification Search
CPC .............. A61C 7/08; A61C 7/00; A61C 7/10
USPC .............................................. 433/6, 24, 215
See application file for complete search history.

(56) References Cited

U.S. PATENT DOCUMENTS

| 2,171,695 A | 9/1939 | Harper |
| 2,194,790 A | 3/1940 | Gluck |
| 2,467,432 A | 4/1949 | Kesling |
| 2,531,222 A | 11/1950 | Kesling |
| 3,089,487 A | 5/1963 | Enicks et al. |
| 3,178,820 A * | 4/1965 | Kesling ............... 433/6 |
| 3,211,143 A | 10/1965 | Grossberg |
| 3,247,844 A * | 4/1966 | Berghash ............. 128/862 |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |

(Continued)

FOREIGN PATENT DOCUMENTS

| AU | 3031677 | 5/1979 |
| AU | 517102 | 7/1981 |

(Continued)

OTHER PUBLICATIONS

Alexander, et al. "The DigiGraph Work Station Part 2, Clinical Management". JCO (Jul. 1990), pp. 402-407.

(Continued)

*Primary Examiner* — Edward Moran
(74) *Attorney, Agent, or Firm* — Shay Glenn LLP

(57) ABSTRACT

Methods, systems, and apparatuses for dental appliance reinforcement are provided. One dental appliance includes a number of tooth apertures for the placement of teeth therein wherein the number of tooth apertures include an interior surface and an exterior surface, and a reinforcement rib positioned along the exterior surface.

15 Claims, 9 Drawing Sheets

(56) References Cited

U.S. PATENT DOCUMENTS

| | | | |
|---|---|---|---|
| 3,860,803 A | 1/1975 | Levine | |
| 3,885,310 A | 5/1975 | Northcutt | |
| 3,916,526 A | 11/1975 | Schudy | |
| 3,922,786 A | 12/1975 | Lavin | |
| 3,949,477 A | 4/1976 | Cohen et al. | |
| 3,950,851 A | 4/1976 | Bergersen | |
| 3,955,282 A | 5/1976 | McNall | |
| 3,983,628 A | 10/1976 | Acevedo | |
| 4,014,096 A | 3/1977 | Dellinger | |
| 4,055,895 A | 11/1977 | Huge | |
| 4,117,596 A | 10/1978 | Wallshein | |
| 4,139,944 A | 2/1979 | Bergersen | |
| 4,179,811 A * | 12/1979 | Hinz ................................ | 433/6 |
| 4,183,141 A | 1/1980 | Dellinger | |
| 4,195,046 A | 3/1980 | Kesling | |
| 4,253,828 A | 3/1981 | Coles et al. | |
| 4,255,138 A | 3/1981 | Frohn | |
| 4,299,568 A | 11/1981 | Crowley | |
| 4,324,546 A | 4/1982 | Heitlinger et al. | |
| 4,324,547 A | 4/1982 | Arcan et al. | |
| 4,348,178 A | 9/1982 | Kurz | |
| 4,419,992 A | 12/1983 | Chorbajian | |
| 4,433,956 A | 2/1984 | Witzig | |
| 4,433,960 A | 2/1984 | Garito et al. | |
| 4,439,154 A | 3/1984 | Mayclin | |
| 4,449,928 A | 5/1984 | von Weissenfluh | |
| 4,478,580 A | 10/1984 | Barrut | |
| 4,500,294 A | 2/1985 | Lewis | |
| 4,526,540 A | 2/1985 | Dellinger | |
| 4,504,225 A | 3/1985 | Yoshii | |
| 4,505,673 A | 3/1985 | Yoshii | |
| 4,519,386 A | 5/1985 | Sullivan | |
| 4,553,936 A | 11/1985 | Wang | |
| 4,575,330 A | 3/1986 | Hull | |
| 4,575,805 A | 3/1986 | Moermann et al. | |
| 4,591,341 A | 5/1986 | Andrews | |
| 4,608,021 A | 8/1986 | Barrett | |
| 4,609,349 A | 9/1986 | Cain | |
| 4,611,288 A | 9/1986 | Duret et al. | |
| 4,629,424 A | 12/1986 | Lauks et al. | |
| 4,638,145 A | 1/1987 | Sakuma et al. | |
| 4,656,860 A | 4/1987 | Orthuber et al. | |
| 4,663,720 A | 5/1987 | Duret et al. | |
| 4,664,626 A | 5/1987 | Kesling | |
| 4,665,621 A | 5/1987 | Ackerman et al. | |
| 4,676,747 A | 6/1987 | Kesling | |
| 4,742,464 A | 5/1988 | Duret et al. | |
| 4,755,139 A | 7/1988 | Abbatte et al. | |
| 4,757,824 A | 7/1988 | Chaumet | |
| 4,763,791 A | 8/1988 | Halverson et al. | |
| 4,764,111 A | 8/1988 | Knierim | |
| 4,790,752 A | 12/1988 | Cheslak | |
| 4,793,803 A | 12/1988 | Martz | |
| 4,798,534 A | 1/1989 | Breads | |
| 4,830,612 A | 5/1989 | Bergersen | |
| 4,836,778 A | 6/1989 | Baumrind | |
| 4,837,732 A | 6/1989 | Brandestini et al. | |
| 4,850,864 A | 7/1989 | Diamond | |
| 4,850,865 A | 7/1989 | Napolitano | |
| 4,856,991 A | 8/1989 | Breads et al. | |
| 4,877,398 A | 10/1989 | Kesling | |
| 4,880,380 A | 11/1989 | Martz | |
| 4,886,451 A | 12/1989 | Cetlin | |
| 4,889,238 A | 12/1989 | Batchelor | |
| 4,890,608 A | 1/1990 | Steer | |
| 4,932,866 A | 6/1990 | Guis | |
| 4,935,635 A | 6/1990 | O'Harra | |
| 4,936,862 A | 6/1990 | Walker et al. | |
| 4,937,928 A | 7/1990 | van der Zel | |
| 4,941,826 A | 7/1990 | Loran et al. | |
| 4,952,928 A | 8/1990 | Carroll et al. | |
| 4,964,770 A | 10/1990 | Steinbichler | |
| 4,975,052 A | 12/1990 | Spencer et al. | |
| 4,983,334 A | 1/1991 | Adell | |
| 4,997,369 A | 3/1991 | Shafir | |
| 5,002,485 A | 3/1991 | Aagesen | |
| 5,011,405 A | 4/1991 | Lemchen | |
| 5,015,183 A | 5/1991 | Fenick | |
| 5,017,133 A | 5/1991 | Miura | |
| 5,018,969 A | 5/1991 | Andreiko et al. | |
| 5,027,281 A | 6/1991 | Rekow et al. | |
| 5,035,613 A | 7/1991 | Breads et al. | |
| 5,037,295 A | 8/1991 | Bergersen | |
| 5,055,039 A | 10/1991 | Abatte et al. | |
| 5,059,118 A | 10/1991 | Breads et al. | |
| 5,061,839 A | 10/1991 | Matsuno et al. | |
| 5,083,919 A | 1/1992 | Quachi | |
| 100,316 A | 3/1992 | Wildman | |
| 5,094,614 A | 3/1992 | Wildman | |
| 5,103,838 A | 4/1992 | Yousif | |
| 5,114,339 A | 5/1992 | Guis | |
| 5,121,333 A | 6/1992 | Riley et al. | |
| 5,123,425 A | 6/1992 | Shannon et al. | |
| 5,125,832 A | 6/1992 | Kesling | |
| 5,128,870 A | 7/1992 | Erdman et al. | |
| 5,130,064 A | 7/1992 | Smalley et al. | |
| 5,131,843 A | 7/1992 | Hilgers et al. | |
| 5,131,844 A | 7/1992 | Marinaccio et al. | |
| 5,139,419 A | 8/1992 | Andreiko et al. | |
| 5,145,364 A | 9/1992 | Martz et al. | |
| 5,176,517 A | 1/1993 | Truax | |
| 5,184,306 A | 2/1993 | Erdman et al. | |
| 5,186,623 A | 2/1993 | Breads et al. | |
| 5,194,003 A | 3/1993 | Garay et al. | |
| 5,204,670 A | 4/1993 | Stinton | |
| 5,222,499 A | 6/1993 | Allen et al. | |
| 5,224,049 A | 6/1993 | Mushabac | |
| 5,238,404 A * | 8/1993 | Andreiko ........................ | 433/20 |
| 5,242,304 A | 9/1993 | Truax et al. | |
| 5,245,592 A | 9/1993 | Kuemmel et al. | |
| 5,257,203 A | 10/1993 | Riley et al. | |
| 5,273,429 A | 12/1993 | Rekow et al. | |
| 5,278,756 A | 1/1994 | Lemchen et al. | |
| 5,306,144 A | 4/1994 | Hibst et al. | |
| 5,314,335 A | 5/1994 | Fung | |
| 5,324,186 A | 6/1994 | Bakanowski | |
| 5,328,362 A | 7/1994 | Watson et al. | |
| 5,335,657 A | 8/1994 | Terry et al. | |
| 5,338,198 A | 8/1994 | Wu et al. | |
| 5,340,309 A | 8/1994 | Robertson | |
| 5,342,202 A | 8/1994 | Deshayes | |
| 5,344,315 A * | 9/1994 | Hanson ........................... | 433/20 |
| 5,368,478 A | 11/1994 | Andreiko et al. | |
| 5,372,502 A | 12/1994 | Massen et al. | |
| D354,355 S | 1/1995 | Hilgers | |
| 5,382,164 A | 1/1995 | Stern | |
| 5,395,238 A | 3/1995 | Andreiko et al. | |
| 5,415,542 A | 5/1995 | Kesling | |
| 5,431,562 A | 7/1995 | Andreiko et al. | |
| 5,440,326 A | 8/1995 | Quinn | |
| 5,440,496 A | 8/1995 | Andersson et al. | |
| 5,447,432 A | 9/1995 | Andreiko et al. | |
| 5,449,703 A | 9/1995 | Mitra et al. | |
| 5,452,219 A | 9/1995 | Dehoff et al. | |
| 5,454,717 A | 10/1995 | Andreiko et al. | |
| 5,456,600 A | 10/1995 | Andreiko et al. | |
| 5,474,448 A | 12/1995 | Andreiko et al. | |
| 5,487,662 A | 1/1996 | Kipke et al. | |
| RE35,169 E | 3/1996 | Lemchen et al. | |
| 5,499,633 A | 3/1996 | Fenton | |
| 5,518,397 A | 5/1996 | Andreiko et al. | |
| 5,522,725 A | 6/1996 | Jordan et al. | |
| 5,528,735 A | 6/1996 | Strasnick et al. | |
| 5,533,895 A | 7/1996 | Andreiko et al. | |
| 5,540,732 A | 7/1996 | Testerman | |
| 5,542,842 A | 8/1996 | Andreiko et al. | |
| 5,543,780 A | 8/1996 | McAuley et al. | |
| 5,549,476 A | 8/1996 | Stern | |
| 5,562,448 A | 10/1996 | Mushabac | |
| 5,570,182 A | 10/1996 | Nathel et al. | |
| 5,575,655 A | 11/1996 | Darnell | |
| 5,583,977 A | 12/1996 | Seidl | |
| 5,587,912 A | 12/1996 | Andersson et al. | |
| 5,588,098 A | 12/1996 | Chen et al. | |

(56) References Cited

U.S. PATENT DOCUMENTS

| | | | |
|---|---|---|---|
| 5,605,459 A | 2/1997 | Kuroda et al. | |
| 5,607,305 A | 3/1997 | Andersson et al. | |
| 5,614,075 A | 3/1997 | Andre | |
| 5,621,648 A | 4/1997 | Crump | |
| 5,626,537 A | 5/1997 | Danyo et al. | |
| 5,645,420 A | 7/1997 | Bergersen | |
| 5,645,421 A | 7/1997 | Slootsky | |
| 5,651,671 A | 7/1997 | Seay et al. | |
| 5,655,653 A | 8/1997 | Chester | |
| 5,659,420 A | 8/1997 | Wakai et al. | |
| 5,683,243 A | 11/1997 | Andreiko et al. | |
| 5,683,244 A | 11/1997 | Truax | |
| 5,691,539 A | 11/1997 | Pfeiffer | |
| 5,692,894 A | 12/1997 | Schwartz et al. | |
| 5,711,665 A | 1/1998 | Adam et al. | |
| 5,711,666 A * | 1/1998 | Hanson | A61C 7/145 433/11 |
| 5,725,376 A | 3/1998 | Poirier | |
| 5,725,378 A | 3/1998 | Wang | |
| 5,730,151 A | 3/1998 | Summer et al. | |
| 5,733,126 A | 3/1998 | Andersson et al. | |
| 5,737,084 A | 4/1998 | Ishihara | |
| 5,740,267 A | 4/1998 | Echerer et al. | |
| 5,742,700 A | 4/1998 | Yoon et al. | |
| 5,769,631 A | 6/1998 | Williams | |
| 5,774,425 A | 6/1998 | Ivanov et al. | |
| 5,790,242 A | 8/1998 | Stern et al. | |
| 5,799,100 A | 8/1998 | Clarke et al. | |
| 5,800,162 A * | 9/1998 | Shimodaira | A61C 7/14 433/8 |
| 5,800,174 A | 9/1998 | Andersson | |
| 5,813,854 A | 9/1998 | Nikodem | |
| 5,816,800 A | 10/1998 | Brehm et al. | |
| 5,818,587 A | 10/1998 | Devaraj et al. | |
| 5,823,778 A | 10/1998 | Schmitt et al. | |
| 5,848,115 A | 12/1998 | Little et al. | |
| 5,857,853 A | 1/1999 | van Nifterick et al. | |
| 5,866,058 A | 2/1999 | Batchelder et al. | |
| 5,876,199 A | 3/1999 | Bergersen | |
| 5,879,158 A | 3/1999 | Doyle et al. | |
| 5,880,961 A | 3/1999 | Crump | |
| 5,880,962 A | 3/1999 | Andersson et al. | |
| 5,882,192 A | 3/1999 | Bergersen | |
| 5,886,702 A | 3/1999 | Migdal et al. | |
| 5,890,896 A | 4/1999 | Padial | |
| 5,904,479 A | 5/1999 | Staples | |
| 5,934,288 A | 8/1999 | Avila et al. | |
| 5,957,686 A | 9/1999 | Anthony | |
| 5,964,587 A | 10/1999 | Sato | |
| 5,971,754 A | 10/1999 | Sondhi et al. | |
| 5,975,893 A * | 11/1999 | Chishti | A61C 7/00 |
| 5,975,906 A | 11/1999 | Knutson | |
| 5,980,246 A | 11/1999 | Ramsay et al. | |
| 5,989,023 A | 11/1999 | Summer et al. | |
| 6,002,706 A | 12/1999 | Staver et al. | |
| 6,015,289 A | 1/2000 | Andreiko et al. | |
| 6,018,713 A | 1/2000 | Coli et al. | |
| 6,044,309 A | 3/2000 | Honda | |
| 6,049,743 A | 4/2000 | Baba | |
| 6,053,731 A | 4/2000 | Heckenberger | |
| 6,062,861 A | 5/2000 | Andersson | |
| 6,068,482 A | 5/2000 | Snow | |
| 6,070,140 A | 5/2000 | Tran | |
| 6,099,303 A | 8/2000 | Gibbs et al. | |
| 6,099,314 A | 8/2000 | Kopelman et al. | |
| 6,123,544 A | 9/2000 | Cleary | |
| 6,152,731 A | 11/2000 | Jordan et al. | |
| 6,154,676 A | 11/2000 | Levine | |
| 6,183,248 B1 | 2/2001 | Chishti et al. | |
| 6,183,249 B1 | 2/2001 | Brennan et al. | |
| 6,186,780 B1 | 2/2001 | Hibst et al. | |
| 6,190,165 B1 | 2/2001 | Andreiko et al. | |
| 6,200,133 B1 | 3/2001 | Kittelsen | |
| 6,201,880 B1 | 3/2001 | Elbaum et al. | |
| 6,212,435 B1 | 4/2001 | Lattner et al. | |
| 6,217,334 B1 | 4/2001 | Hultgren | |
| 6,227,850 B1 | 5/2001 | Chishti et al. | |
| 6,231,338 B1 | 5/2001 | de Josselin de Jong et al. | |
| 6,239,705 B1 | 5/2001 | Glen | |
| 6,243,601 B1 | 6/2001 | Wist | |
| 6,244,861 B1 | 6/2001 | Andreiko et al. | |
| 6,263,234 B1 | 7/2001 | Engelhardt et al. | |
| 6,283,761 B1 | 9/2001 | Joao | |
| 6,288,138 B1 | 9/2001 | Yamamoto | |
| 6,299,438 B1 | 10/2001 | Sahagian et al. | |
| 6,309,215 B1 | 10/2001 | Phan et al. | |
| 6,313,432 B1 | 11/2001 | Nagata et al. | |
| 6,315,553 B1 | 11/2001 | Sachdeva et al. | |
| 6,322,359 B1 | 11/2001 | Jordan et al. | |
| 6,328,745 B1 | 12/2001 | Ascherman | |
| 6,332,774 B1 * | 12/2001 | Chikami | 433/20 |
| 6,334,073 B1 | 12/2001 | Levine | |
| 6,350,120 B1 | 2/2002 | Sachdeva et al. | |
| 6,364,660 B1 | 4/2002 | Durbin et al. | |
| 6,382,975 B1 | 5/2002 | Poirier | |
| 6,386,878 B1 | 5/2002 | Pavlovskaia et al. | |
| 6,394,802 B1 | 5/2002 | Hahn | |
| 6,398,548 B1 | 6/2002 | Muhammad et al. | |
| 6,402,510 B1 | 6/2002 | Williams | |
| 6,402,707 B1 | 6/2002 | Ernst | |
| 6,405,729 B1 | 6/2002 | Thornton | |
| 6,406,292 B1 | 6/2002 | Chishti et al. | |
| 6,409,504 B1 | 6/2002 | Jones et al. | |
| 6,413,086 B1 | 7/2002 | Womack | |
| 6,414,264 B1 | 7/2002 | von Falkenhausen | |
| 6,414,708 B1 | 7/2002 | Carmeli et al. | |
| 6,435,871 B1 | 8/2002 | Inman | |
| 6,436,058 B1 | 8/2002 | Krahner et al. | |
| 6,441,354 B1 | 8/2002 | Seghatol et al. | |
| 6,450,167 B1 | 9/2002 | David et al. | |
| 6,450,807 B1 | 9/2002 | Chishti et al. | |
| 6,462,301 B1 | 10/2002 | Scott et al. | |
| 6,470,338 B1 | 10/2002 | Rizzo et al. | |
| 6,471,511 B1 | 10/2002 | Chishti et al. | |
| 6,471,512 B1 | 10/2002 | Sachdeva et al. | |
| 6,471,970 B1 | 10/2002 | Fanara et al. | |
| 6,482,002 B2 | 11/2002 | Jordan et al. | |
| 6,482,298 B1 | 11/2002 | Bhatnagar | |
| 6,496,814 B1 | 12/2002 | Busche | |
| 6,496,816 B1 | 12/2002 | Thiesson et al. | |
| 6,499,026 B1 | 12/2002 | Rivette et al. | |
| 6,499,995 B1 | 12/2002 | Schwartz | |
| 6,507,832 B1 | 1/2003 | Evans et al. | |
| 6,514,074 B1 | 2/2003 | Chishti et al. | |
| 6,515,593 B1 | 2/2003 | Stark et al. | |
| 6,516,288 B2 | 2/2003 | Bagne | |
| 6,516,805 B1 | 2/2003 | Thornton | |
| 6,520,772 B2 | 2/2003 | Williams | |
| 6,523,009 B1 | 2/2003 | Wilkins | |
| 6,523,019 B1 | 2/2003 | Borthwick | |
| 6,524,101 B1 | 2/2003 | Phan et al. | |
| 6,526,168 B1 | 2/2003 | Ornes et al. | |
| 6,526,982 B1 | 3/2003 | Strong | |
| 6,529,891 B1 | 3/2003 | Heckerman | |
| 6,529,902 B1 | 3/2003 | Kanevsky et al. | |
| 6,532,455 B1 | 3/2003 | Martin et al. | |
| 6,535,865 B1 | 3/2003 | Skaaning et al. | |
| 6,540,512 B1 | 4/2003 | Sachdeva et al. | |
| 6,540,707 B1 | 4/2003 | Stark et al. | |
| 6,542,593 B1 | 4/2003 | Bowman Amuah | |
| 6,542,881 B1 | 4/2003 | Meidan et al. | |
| 6,542,894 B1 | 4/2003 | Lee et al. | |
| 6,542,903 B2 | 4/2003 | Hull et al. | |
| 6,551,243 B2 | 4/2003 | Bocionek et al. | |
| 6,554,611 B2 | 4/2003 | Chishti et al. | |
| 6,554,837 B1 | 4/2003 | Hauri et al. | |
| 6,556,659 B1 | 4/2003 | Bowman Amuah | |
| 6,556,977 B1 | 4/2003 | Lapointe et al. | |
| 6,560,592 B1 | 5/2003 | Reid et al. | |
| 6,564,209 B1 | 5/2003 | Dempski et al. | |
| 6,567,814 B1 | 5/2003 | Bankier et al. | |
| 6,571,227 B1 | 5/2003 | Agrafiotis et al. | |
| 6,572,372 B1 | 6/2003 | Phan et al. | |
| 6,573,998 B2 | 6/2003 | Cohen Sabban | |

(56) References Cited

U.S. PATENT DOCUMENTS

| | | |
|---|---|---|
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 * | 11/2004 | Abolfathi et al. ............... 433/4 |
| 6,830,450 B2 | 12/2004 | Knopp et al. |
| 6,832,912 B2 | 12/2004 | Mao |
| 6,832,914 B1 | 12/2004 | Bonnet et al. |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,984,128 B2 | 1/2006 | Breining et al. |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,831,322 B2 | 11/2010 | Liu et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |

(56) References Cited

U.S. PATENT DOCUMENTS

| | | |
|---|---|---|
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,038,444 B2 | 10/2011 | Kitching et al. |
| 8,045,772 B2 | 10/2011 | Kosuge et al. |
| 8,077,949 B2 | 12/2011 | Liang et al. |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,201,560 B2 | 6/2012 | Dembro |
| 8,240,018 B2 | 8/2012 | Walter et al. |
| 8,275,180 B2 | 9/2012 | Kuo |
| 8,294,657 B2 | 10/2012 | Kim et al. |
| 8,296,952 B2 | 10/2012 | Greenberg |
| 8,306,608 B2 | 11/2012 | Mandelis et al. |
| 8,314,764 B2 | 11/2012 | Kim et al. |
| 8,332,015 B2 | 12/2012 | Ertl |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,488,113 B2 | 7/2013 | Thiel et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,639,477 B2 | 1/2014 | Chelnokov et al. |
| 8,650,586 B2 | 2/2014 | Lee et al. |
| 8,738,394 B2 | 5/2014 | Kuo |
| 8,771,149 B2 | 7/2014 | Rahman et al. |
| 8,843,381 B2 | 9/2014 | Kuo et al. |
| 8,870,566 B2 | 10/2014 | Bergersen |
| 8,874,452 B2 | 10/2014 | Kuo |
| 8,899,976 B2 | 12/2014 | Chen et al. |
| 8,944,812 B2 | 2/2015 | Kou |
| 8,992,216 B2 | 3/2015 | Karazivan |
| 9,004,915 B2 | 4/2015 | Moss et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,211,166 B2 | 12/2015 | Kuo et al. |
| 9,214,014 B2 | 12/2015 | Levin |
| 9,241,774 B2 | 1/2016 | Li et al. |
| 9,277,972 B2 | 3/2016 | Brandt et al. |
| 9,403,238 B2 | 8/2016 | Culp |
| 9,414,897 B2 | 8/2016 | Wu et al. |
| 9,463,287 B1 | 10/2016 | Lorberbaum et al. |
| 9,492,243 B2 | 11/2016 | Kuo |
| 9,566,132 B2 | 2/2017 | Stone-Collonge et al. |
| 9,589,329 B2 | 3/2017 | Levin |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 10,123,706 B2 | 11/2018 | Elbaz et al. |
| 10,123,853 B2 | 11/2018 | Moss et al. |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |
| 10,275,862 B2 | 4/2019 | Levin |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0006597 A1 | 1/2002 | Andreiko et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1* | 12/2002 | Phan et al. ................ 433/6 |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0068598 A1 | 4/2003 | Vallittu et al. |
| 2003/0095697 A1 | 5/2003 | Wood et al. |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1* | 12/2003 | Cronauer ................ A61C 7/08 433/6 |
| 2003/0224313 A1 | 12/2003 | Bergersen |
| 2003/0224314 A1* | 12/2003 | Bergersen ................ 433/6 |
| 2004/0002873 A1 | 1/2004 | Sachdeva |
| 2004/0009449 A1 | 1/2004 | Mah et al. |
| 2004/0013994 A1* | 1/2004 | Goldberg ................ A61C 7/14 433/8 |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0209218 A1* | 10/2004 | Chishti et al. ................ 433/6 |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0259049 A1 | 12/2004 | Kopelman et al. |
| 2005/0003318 A1 | 1/2005 | Choi et al. |
| 2005/0023356 A1 | 2/2005 | Wiklof et al. |

(56) References Cited

U.S. PATENT DOCUMENTS

| | | |
|---|---|---|
| 2005/0031196 A1 | 2/2005 | Moghaddam et al. |
| 2005/0037311 A1* | 2/2005 | Bergersen .................. 433/6 |
| 2005/0037312 A1 | 2/2005 | Uchida |
| 2005/0038669 A1 | 2/2005 | Sachdeva et al. |
| 2005/0042569 A1 | 2/2005 | Plan et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1* | 5/2006 | Wen .................. 433/6 |
| 2006/0098007 A1 | 5/2006 | Rouet et al. |
| 2006/0099545 A1 | 5/2006 | Lia et al. |
| 2006/0099546 A1* | 5/2006 | Bergersen .................. 433/6 |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0204078 A1 | 9/2006 | Orth et al. |
| 2006/0223022 A1 | 10/2006 | Solomon |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118886 A1 | 5/2008 | Liang et al. |
| 2008/0141534 A1* | 6/2008 | Hilliard ............... 29/896.11 |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0181346 A1 | 7/2009 | Orth |
| 2009/0210032 A1 | 8/2009 | Beiski et al. |
| 2009/0218514 A1 | 9/2009 | Klunder et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2010/0019170 A1 | 1/2010 | Hart et al. |
| 2010/0045902 A1 | 2/2010 | Ikeda et al. |
| 2010/0068676 A1 | 3/2010 | Mason et al. |
| 2010/0145664 A1 | 6/2010 | Hultgren et al. |
| 2010/0145898 A1 | 6/2010 | Malfliet et al. |
| 2010/0165275 A1 | 7/2010 | Tsukamoto et al. |
| 2010/0179789 A1 | 7/2010 | Sachdeva et al. |
| 2010/0231577 A1 | 9/2010 | Kim et al. |
| 2010/0268363 A1 | 10/2010 | Karim et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0164810 A1 | 7/2011 | Zang et al. |
| 2012/0148972 A1* | 6/2012 | Lewis .................. A61C 7/20 433/10 |
| 2012/0166213 A1 | 6/2012 | Arnone et al. |
| 2013/0103176 A1 | 4/2013 | Kopelman et al. |
| 2014/0081091 A1 | 3/2014 | Abolfathi et al. |
| 2014/0136222 A1 | 5/2014 | Arnone et al. |
| 2014/0142902 A1 | 5/2014 | Chelnokov et al. |
| 2014/0280376 A1 | 9/2014 | Kuo |
| 2015/0004553 A1 | 1/2015 | Li et al. |
| 2015/0132708 A1 | 5/2015 | Kuo |
| 2015/0173856 A1 | 6/2015 | Iowe et al. |
| 2015/0238283 A1 | 8/2015 | Tanugula et al. |
| 2015/0320320 A1 | 11/2015 | Kopelman et al. |
| 2015/0320532 A1 | 11/2015 | Matty et al. |
| 2016/0003610 A1 | 1/2016 | Lampert et al. |
| 2016/0051345 A1 | 2/2016 | Levin |
| 2016/0064898 A1 | 3/2016 | Atiya et al. |

(56) References Cited

U.S. PATENT DOCUMENTS

| | | |
|---|---|---|
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0338799 A1 | 11/2016 | Wu et al. |
| 2016/0367339 A1 | 12/2016 | Khardekar et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0071705 A1 | 3/2017 | Kuo |
| 2017/0100212 A1 | 4/2017 | Sherwood et al. |
| 2017/0100213 A1 | 4/2017 | Kuo |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0319296 A1 | 11/2017 | Webber et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071055 A1 | 3/2018 | Kuo |
| 2018/0125610 A1 | 5/2018 | Carrier, Jr. et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |
| 2018/0192877 A1 | 7/2018 | Atiya et al. |
| 2018/0280118 A1 | 10/2018 | Cramer |
| 2018/0284727 A1 | 10/2018 | Cramer et al. |
| 2018/0318043 A1 | 11/2018 | Li et al. |
| 2018/0353264 A1 | 12/2018 | Riley et al. |
| 2018/0360567 A1 | 12/2018 | Xue et al. |
| 2018/0368944 A1 | 12/2018 | Sato et al. |
| 2018/0368961 A1 | 12/2018 | Shanjani et al. |
| 2019/0019187 A1 | 1/2019 | Miller et al. |
| 2019/0021817 A1 | 1/2019 | Sato et al. |
| 2019/0029522 A1 | 1/2019 | Sato et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076026 A1 | 3/2019 | Elbaz et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |
| 2019/0095539 A1 | 3/2019 | Elbaz et al. |
| 2019/0099129 A1 | 4/2019 | Kopelman et al. |
| 2019/0105130 A1 | 4/2019 | Grove et al. |
| 2019/0125494 A1 | 5/2019 | Li et al. |

FOREIGN PATENT DOCUMENTS

| | | |
|---|---|---|
| AU | 5598894 | 6/1994 |
| CA | 1121955 | 4/1982 |
| CN | 1575782 A | 2/2005 |
| CN | 1655732 A | 8/2005 |
| CN | 1655733 A | 8/2005 |
| CN | 102017658 A | 4/2011 |
| DE | 2749802 | 5/1978 |
| DE | 3526198 A1 | 2/1986 |
| DE | 4207169 A1 | 9/1993 |
| DE | 69327661 | 7/2000 |
| DE | 102005043627 A1 | 3/2007 |
| EP | 0091876 | 10/1983 |
| EP | 0299490 | 1/1989 |
| EP | 0376873 | 7/1990 |
| EP | 0428152 A1 | 5/1991 |
| EP | 0490848 | 6/1992 |
| EP | 0541500 | 5/1993 |
| EP | 0667753 | 8/1995 |
| EP | 0731673 | 9/1996 |
| EP | 714632 B1 | 5/1997 |
| EP | 0774933 | 5/1997 |
| EP | 1941843 A2 | 7/2008 |
| EP | 1989764 B1 | 7/2012 |
| ES | 463897 | 1/1980 |
| FR | 2369828 | 6/1978 |
| FR | 2652256 | 3/1991 |
| FR | 2867377 A1 | 9/2005 |
| FR | 2930334 A1 | 10/2009 |
| GB | 1550777 | 8/1979 |
| JP | 53-058191 | 5/1978 |
| JP | 53-058191 A | 5/1978 |
| JP | 04-028359 | 1/1992 |
| JP | 04-028359 A | 1/1992 |
| JP | 08-508174 | 9/1996 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2008067732 A | 3/2008 |
| JP | 2008523370 A | 7/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| KR | 10-20020062793 A | 7/2002 |
| KR | 10-20090065778 A | 6/2009 |
| WO | WO 1998/032394 | 7/1988 |
| WO | WO 1990/008512 | 8/1990 |
| WO | WO91/004713 A1 | 4/1991 |
| WO | WO 1991/004713 | 4/1991 |
| WO | WO92/03102 A1 | 3/1992 |
| WO | WO94/010935 A1 | 5/1994 |
| WO | WO 1994/010935 | 5/1994 |
| WO | WO96/23452 A1 | 8/1996 |
| WO | WO 1998/044865 | 10/1998 |
| WO | WO 1998/058596 | 12/1998 |
| WO | 0108592 A1 | 2/2001 |
| WO | 0280762 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A2 | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |

OTHER PUBLICATIONS

Altschuler et al. "Measuring Surfaces Space-Coded by a . . . ", SPIE Imaging Applications for Automated Industrial Inspection and Assembly, vol. 182 (1979), pp. 187-191.

Altschuler et al. "Analysis of 3-D Data . . . ", IADR Abstracts, Program and Abstracts of Papers, J.of Dental Research, vol. 58, Jan. 1979, Special Issue A, p. 221.

Altschuler et al. "Laser Electro-Optic System for Rapid Three-Dimensional (3D) Topographic Mapping of Surfaces", Optical Engineering, vol. 20 (6) (1981) pp. 953-961.

Altschuler. "3D Mapping of Maxillo-Facial Prosthesis", AADR Abstract #607, 1980, 1 pg.

(56) References Cited

OTHER PUBLICATIONS

American Association for Dental Research, Summary of Activities, Mar. 20-23, 1980, Los Angeles, CA, p. 195.
Andersson et al. "Clinical Results with Titanium Crowns Fabricated with Machine Duplication . . . ", Acta Odontological Scandinavia, vol. 47 (1989), pp. 279-286.
Baumrind, et al. "A Stereophotogrammetric System for the Detection of . . . " NATO Symposium on Applications of Human Biostereometrics, Jul. 9-13, 1978, SPIE vol. 166, pp. 112-123.
Baumrind, et al. "Mapping the Skull in 3-D", Reprinted from The Journal, California Dental Association, vol. 48, No. 2 (1972 Fall Issue), 11 pgs.
Baumrind. "A System for Craniofacial Mapping . . . ", An invited paper submitted to the 1975 Am. Soc. of Photogram . . . Systems, University of Ill., Aug. 26-30, 1975, pp. 142-166.
Baumrind. "Integrated Three-Dimensional Craniofacial Mapping: Background . . . ". Seminars in Orthodontics, vol. 7, No. 4 (Dec. 2001), pp. 223-232.
Begole, et al. "A Computer System for the Analysis of Dental Casts", The Angle Orthodontist, vol. 51, No. 3 (Jul. 1981), pp. 253-259.
Bernard, et al. "Computerized Diagnosis in Orthodontics for . . . ", Abstracts of Papers, Journal of Dental Research, vol. 67, Special Issue Mar. 9-13, 1988, p. 169.
Bhatia, et al. "A Computer-Aided Design for Orthognathic Surgery", British Journal of Oral and Maxillofacial Surgery, vol. 22, (1984), pp. 237-253.
Biggerstaff, et al. "Computerized Analysis of Occlusion in the Postcanine Dentition", American Journal of Orthodontics, vol. 61, Mo. 3 (Mar. 1972), pp. 245-254.
Biggerstaff, "Computerized Diagnostic Setups and Simulations", The Angle Orthodontist, vol. 40, No. 1 (Jan. 1970), pp. 28-36.
Boyd, et al. "Three Dimensional Diagnosis and Orthodontic Treatment of Complex Malocclusions . . . ", Seminars in Orthodontics, vol. 7, No. 4 (Dec. 2001), pp. 274-293.
Brandestini, et al. "Computer Machined Ceramic Inlays; In Vitro . . .". Journal of Dental Research, vol. 64/Special Issues/Abstracts, IADR/AADR Abstracts 1985, p. 208.
Brook, et al. "An Image Analysis System for the Determination of Tooth Dimensions from Study Casts; . . . ", J. Dent. Res., vol. 65, No. 3, Mar. 1986, pp. 428-431.
Burstone (interview), "Dr. Charles J. Burstone on the . . . ", Journal of Clinical Orthodontics, (Part1), vol. 8, No. 7, Jul. 1979, (Part 2) Aug. 1979, vol. 8, No. 8, pp. 539-551.
Burstone, et al. "Precision Adjustment of the Transpalatal Lingual . . . ",Am. Journal of Orthodontics, vol. 79, No. 2 (Feb. 1981), pp. 115-133.
Cardinal Industrial Finishes, Powder Coatings information posted www.cardinalpaint.com on Aug. 25, 2005 (2 pgs.).
Chaconas, et al. "The DIgiGraph Work Station, Part 1, Basic Concepts", JCO (Jun. 1990), pp. 1-20.
Chafetz, et al. "Subsidence of the Femoral Prosthesis . . . " Clinical Orthopaedics and Related Research, No. 201 (Dec. 1985), pp. 60-67.
Chiappone, "Constructing the Gnathologic Setup and Positioner", J. Clin. Orthod., vol. 14 (1980), pp. 121-133.
Cottingham, "Gnathologic Clear Plastic Positioner", Am. J. Orthod. vol. 55, No. 1 (Jan. 1969), pp. 23-31.
Crawford, "Computers in Dentistry: Part 1 . . . ", Canadian Dental Journal, vol. 54 No. 9 (1988), pp. 661-666.
Crawford, "CAD/CAM in the Dental Office: Does it Work?" Canadian Dental Journal, vol. 57 No. 2 (Feb. 1991), pp. 121-123.
Crooks, "CAD/CAM Comes to USC", USC Dentistry (Spring 1990), pp. 14-17.
Cureton, "Correcting Malaligned Mandibular Incisors with Removable Retainers", J. Clin. Orthod. vol. 30 (Jul. 1996), pp. 390-395.
Curry, et al. "Integrated Three-Dimensional Craniofacial Mapping at the . . . ", Seminars in Orthodontics, vol. 7, No. 4 (Dec. 2001) pp. 258-265.
Cutting, et al. "Three-Dimensional Computer-Assisted Design of Craniofacial . . . ", Plastic and Reconstructive Surgery, vol. 77, No. 6 (Jun. 1986), pp. 877-885.
DCS Dental AG, "The CAD/CAM 'DCS Titan System' for Production of Crowns/Bridges", DCS Production AG, Jan. 1992, pp. 1-7.
Defranco, et al. "Three-Dimensional Large Displacement Analysis of Orthodontic Applicances", J. Biomechanics, vol. 9 (1976), pp. 793-801.
Dental Institute of Zurich, Switzerland, Program for International Symposium on Computer Restorations: State of the Art of the CERAC-Method, May 1991, 2 pgs.
Dent-X posted at http://www.dent-x.com/DentSim.htm Sep. 24, 1998 (6 pgs.).
Doyle, Digital Dentistry, Computer Graphics World, Oct. 2000, pp. 50-52, 54.
Duret, "The Dental CAD/CAM General Description of the Project", Hennson International Product Brochure, Jan. 1986, 18 pgs.
Duret, "Vers une posthese informatisee", (English translation also attached), Tonus, vol. 75 (Nov. 15, 1985), pp. 55-57.
Duret, et al. "CAD/CAM Imaging in Dentistry", Current Opinion in Dentistry, vol. 1 (1991), pp. 150-154.
Duret, et al. "CAD-CAM in Dentistry", Journal of the American Dental Association, vol. 117 (Nov. 1988), pp. 715-720.
Economides, "The Microcomputer in the Orthodontic Office", JCO (Nov. 1979), pp. 767-772.
Elsasser, "Some Observations on the History and Uses of the Kesling Positioner", Am. J. Orthod., vol. 36, No. 5 (May 1950), pp. 368-374.
Faber, et al. "Computerized interactive orthodontic treatment planning", Am. J. Orthod., vol. 73, No. 1 (Jan. 1978), pp. 36-46.
Felton, et al. "A computerized analysis of the shape and stability . . . ", Am. Journal of Orthodontics and Dentofacial Orthopedics, vol. 92, No. 6 (1987), pp. 478-483.
Friede, et al. "Accuracy of Cephalometric Prediction in Orthognathic Surgery", Abstract of Papers, Journal of Dental Research, vol. 70 (1987), pp. 754-760.
Futterling, et al. "Automated finite element modeling of a human . . . ," The 6th Int'l Conf. in Central Europe on Comp. Graphics and Visualization '98 (WSCG '98). Feb. 13, 1998.
Gottlieb, et al. "JCO Interviews Dr. James A. McNamura, Jr. on the Frankel Appliance: Part 2: Clinical Management," Journal of Clinical Orthodontics, vol. 16, No. 6 (Jun. 1982.
Grayson, "New Methods . . . ", Symposium: Comp. Fac. Ima. in Oral and Max. Surgery Presented Sep. 13, 1990, J. of Oral and Max. Surg. vol. 48, No. 8, Supp. 1, (Aug. 1990), pp. 5-6.
Guess, et al. "Computer Treatment Estimates in Orthodontics and Orthognathic Surgery", JCO (Apr. 1989), pp. 1-11.
Hoffmann, et al. "Role of Cephalometry for Planning of Jaw . . . ", (article summary in English, article in German), Informationen, (Mar. 1991) pp. 375-396.
Hojjatie, et al. Three-Dimensional Finite Element Analysis of Glass-Ceramic Dental Crowns, J Biomech. (1990) vol. 23, No. 11, pp. 1157-1166.
Huckins, "CAD-CAM Generated Mandibular Model Prototype from MRI Data", Aaoms (1999), p. 96.
JCO Interviews. "Craig Andreiko, DDS, MS on the Elan and Orthos Systems", JCO (Aug. 1994), pp. 459-468.
JCO Interviews. "Dr. Homer W. Phillips on Computers in Orthodontic Practice, Part 2", JCO (Dec. 1983), pp. 819-831.
Jerrold, "The Problem, Electronic Data Transmission and the Law", AJO-DO (Apr. 1988), pp. 478-479.
Jones, et al. "An Assessment of the Fit of a . . . ", British Journal of Orthodontics, vol. 16 (1989), pp. 85-93.
Kamada, et al. "Case Reports on Tooth Positioners Using LTV Vinyl Silicone Rubber", J. Nihon Univ. School of Dentistry, vol. 26, No. 1, (1984), pp. 11-29.
Kamada, et al. "Construction of Tooth Positioners with LTV Vinyl Silicone Rubber . . . ", J. Nihon Univ. School of Dentistry, vol. 24, No. 1 (1982), pp. 1-27.
Kanazawa, et al. "Three-Dimensional Measurements of the Occlusial Surfaces of Upper . . . ", J. Dent. Res., vol. 63, No. 11 (Nov. 1984), pp. 1298-1301.

(56) References Cited

OTHER PUBLICATIONS

Kesling, "Coordinating the Predetermined Pattern and Tooth Positioner with Conventional Treatment", Am. J. Orthod. Oral Surg., vol. 32 (1946), pp. 285-293.
Kesling, "The Philosophy of the Tooth Positioning Appliance", Am. J. Orthod. Oral Surg., vol. 31, No. 6 (Jun. 1945), pp. 297-304.
Kleemann, et al. "The Speed Positioner", J. Clin. Orthod., vol. 30 (1996), pp. 673-680.
Kunii, et al. Articulation Simulation for an Intelligent Dental Care System, Displays (1994) 15: 181-188.
Kuroda, et al. "Three-Dimensional dental cast analyzing system using laser scanning", Am. J. Orthod. Dentofac. Orthop., vol. 110, No. 4 (Oct. 1996), pp. 365-369.
Laurendeau, et al. "A Computer-Vision Technique for the Acquisition and Processing . . . ", IEEE Transactions on Medical Imaging, vol. 10, No. 3 (Sep. 1991), pp. 453-461.
Leinfelder, et al. "A new method for generating ceramic restorations: a CAD-CAM system", J. of the Am. Dental Assoc., vol. 118, No. 5 (Jun. 1989), pp. 703-707.
Manetti, et al. "Computer-aided Cefalometry and New Mechanics . . . ", (Article Summary in English, article in German), Fortschr, Kieferorthop. vol. 44, No. 5 (1983), pp. 370-376.
McCann, "Inside the ADA", Journal of the American Dental Association, vol. 118, (Mar. 1989), pp. 286-294.
McNamara, et al. "Invisible Retainers", J. Clin. Orthodontics, (Aug. 1985), pp. 570-578.
Moermann, et al. "Computer Machined Adhesive Porcelain Inlays . . . ", IADR Abstract 339, Journal of Dental Research, vol. 66(a) (1987), p. 763.
Moermann, et al. "Marginal Adaptation von adhasiven Porzellaninlyays in vitro", Schwizerische Monatsshrift fur Zahnmedizin, vol. 85 (1985), p. 1118-1129.
Nahoum, "The Vacuum Formed Dental Contour Appliance", The New York State Dental Journal, vol. 30, No. 9 (Nov. 1964), pp. 385-390.
Nash, "CEREC CAD/CAM Inlays: Aesthetics and Durability in a Single Appointment", Dentistry Today, vol. 54 (Oct. 1990), pp. 20, 22-23, 54.
Nippon Dental Review "New Orthodontic device-dynamic positioner (D.P.)—I. Approach to the proposal of D.P. and transparent silicone rubber" (1980) 452: 61-74.
Nippon Dental Review "New Orthodontic device-dynamic positioner (D.P.)—II. Practical Application and construction of D.P." (1980) 454: 107-130.
Nippon Dental Review "New Orthodontic device-dynamic positioner (D.P.)—III. Case reports of reversed occlusion" (1980) 457: 146-164.
Nippon Dental Review "New Orthodontic device-dynamic positioner (D.P.)—Case reports of reversed occlusion" (1980) 458: 112-129.
Nishiyama, et al. "A New Construction of Tooth Repositioner by LTV Vinyl Silicone Rubber", J. Nihon U. School of Dentistry, vol. 19 No. 2, (1977), pp. 93-102.
Pinkham, "'Foolish' Concept Propels Technology", Dentist (Jan./Feb. 1989), 3 pgs.
Pinkham, "Inventor's CAD/CAM May Transform Dentistry", Dentist (Sep. 1990), 3 pgs.
Ponitz, "Invisible Retainers", Am. J. Orthodontics, vol. 59, No. 3 (Mar. 1971), pp. 266-272.
PROCERA Research Projects, "PROCERA Research Projects 1993", Abstract CollectiOn, (1993), pp. 3-24.
Proffit, et al. Contemporary Orthodontics (Second Ed.), Chapter 15, Mosby Inc, (Oct. 1992), pp. 470-533.
Raintree Essix, downloaded from internet Aug. 13, 1997 Essix™ Appliances, 7 pages total.
Redmond, et al. (2000) Clinical Implications of Digital Orthodontics, Am J. Orthodont. Dentofacial Orthopedics 117(2):240-242.
Rekow, "A Review of the Developments in Dental CAD/CAM Systems", Dental Clinics: Prosthodontics and Endodontics (1992), pp. 25-33.
Rekow, "CAD/CAM in Dentistry: A Historical Perspective and View of the Future", Journal, vol. 58, No. 4 (Apr. 1992), pp. 283, 287-288.
Rekow, "Computer-Aided Design and Manufacturing in Dentistry: A Review of the State of the Art", The J. of Prosthetic Dentistry, vol. 58, No. 4 (Oct. 1987), pp. 512-516.
Rekow, "CAD/CAM Systems: What is the State of the Art?", J. of the Am. Dental Assoc., vol. 122 (1991), pp. 43-48.
Rekow, "Feasibility of an Automated System for Production of Dental Restorations", PhD Thesis, U. of Minnesota (Nov. 1988), 244 pages.
Richmond, et al. The Development of the PAR Index (Peer Assessment Rating): Reliability and Validity, European Journal of Orthodontics (1992) 14:125-139.
Richmond, et al. Research Reports, "The Devolopment of a 3D Cast Analysis System", British Journal of Orth., vol. 13, No. 1 (Jan. 1986), pp. 53-54.
Richmond, "Recording the Dental Cast in Three Dimensions", Am. J. Orthod. Dentofac. Orthop., vol. 92, No. 3 (Sep. 1987), pp. 199-206.
Rubin, et al. "Stress Analysis of the Human Tooth Using a Three-Dimensional Finite Element Model," J Dent Res, pp. 82-86. (Feb. 1983).
Rudge, "Dental arch analysis: Arch Form, A review of the literature", European J. of Orthod., vol. 3, No. 4 (1981), pp. 279-284.
Sakuda, et al. "Integrated information-processing system in clinical orthodontics: An approach . . . ", Am. J. Orthod. Dentofac. Ortho., vol. 101, No. 3 (Mar. 1992), pp. 210-220.
Schellhas, et al. "Three-Dimensional Computed Tomography in Maxilliofacial . . . ", Arch Otolamgol Head Neck Surg. vol. 114, (Apr. 1988), pp. 438-442.
Schroeder, et al. Eds. The Visual Toolkit, Prentice Hall PTR, New Jersey (1998) Chapters 6, 8 & 9, (pp. 153-210, 309-354, and 355-428, respectively).
Shilliday, "Minimizing Finishing Problems with the Mini-Positioner", Am. J. Orthod., vol. 59 (1971), pp. 596-599.
Sinclair, The Readers' Corner, Journal of Clinical Orthodontics, vol. 26, No. 6 (Jun. 1992) pp. 369-372.
Sirona Dental Systems GmbH, "CEREC 3D, Manuel utiliseur, Version 2.0X" (in French), 2003, 114 pages.
Stoll, et al. "Computer-aided Technologies in Dentistry", (Article Summary in English, Article in German), Dtsch Zahnarztl, vol. 45 (1990), pp. 314-322.
Truax, "Truax Clasp-Less(TM) Appliance System," Funct. Orthod., 9(5):22-4, 26-8 (Sep.-Oct. 1992).
U.S. Dept. of Commerce, Nat. Tech. Info. Service, "Automated Crown Reapplication . . . ", Solid Photography Inc., Melville, NY, Oct. 1977, 20 pgs.
U.S. Dept. of Commerce, Nat. Tech. Info. Service, "Holodontography: An Introduction . . . ", School of Aerospace Medicine Brooks AFB Tex, Mar. 1973, 37 pg.
U.S. Appl. No. 60/050,342, filed Jun. 20, 1997, 27 pgs.
Van Der Linden, et al. "Three-Dimensional Analysis of Dental Casts by Means of the Optocom", J. Dent. Res, vol. 51, No. 4 (Jul.-Aug. 1972), pp. 1101.
Van Der Linden, et al. "A New Method to Determine Tooth Positions and Dental Arch Dimensions", J. Dent. Res, vol. 51, No. 4 (Jul.-Aug. 1972), pp. 1104.
Van Der Zel, "Ceramic-fused-to-metal Restorations with a New CAD/CAM System", Quintessence International, vol. 24, No. 11 (1993), pp. 769-778.
Varady, et al. "Reverse Engineering of Geometric Models—An Introduction", Computer-Aided Design, vol. 29, No. 4 (1997), pp. 255-268.
Warunek, et al. "Clinical Use of Silicone Elastomer Appliances", JCO, (Oct. 1989), pp. 694-700.
Warunek, et al. "Physical and Mechanical Properties of Elastomers in Orthodontic Positioners", Am. J. ORthod. Dentofac. Ortho., vol. 95 (1989) pp. 389-400.
Wells. "Application of the Positioner Appliance in Orthodontic Treatment", Am. J. ORthod. vol. 58 (1970), pp. 351-366.
Williams, "Dentistry and CAD/CAM: Another French Revolution", J. of Dental Practice Admin., (Jan/Mar. 1987), pp. 2-5.

(56) References Cited

OTHER PUBLICATIONS

Williams, "The Switzerland and Minnesota Developments in CAD/CAM", J. of Dental Practice Admin., (Apr./Jun. 1987), pp. 50-55.
Wishan, "New . . . ", Symposium: Comp. Facial Imaging . . . Presented on Sep. 13, 1990, New Orleans, J. of Oral and Max. Surgery, vol. 48, No. 8, Supp.1 (Aug. 1990), pp. 5.
Yamamoto, et al. "Three-Dimensional Measurement of Dental Cast Profiles . . . ", Annual INt'l Conf. of IEEE Eng. in Med. and BiologySoc., vol. 12, No. 5 (1990), pp. 2052-2053.
Yamamoto, et al. "Optical Measurement of Dental Cast Profiles . . .", Frontiers in Med. and Bio. Eng., vol. 1, No. 2 (1988), pp. 119-130.
Communication Pursuant to Article 94(3) EPC from related EP Application No. 09746147, dated Oct. 2, 2017, 8 pages.
Alcaniz et aL; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Andrews, The Six Keys to Optimal Occlusion Straight Wire, Chapter 3, L.A. Wells; pp. 13-24; (year of pub. sufficiently earlier than effective US filing date and any foreign priority date) 1989.
Bartels et al.; An Introduction to Splines for Use in Computer Graphics and Geometric Modeling; Morgan Kaufmann Publishers; pp. 422-425 Jan. 1, 1987.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.

Bookstein; Principal warps: Thin-plate splines and decomposition of deformations; IEEE Transactions on pattern analysis and machine intelligence; 11(6); pp. 567-585; Jun. 1989.
Bourke, Coordinate System Transformation; 1 page; retrived from the internet (http://astronomy.swin.edu.au/'pbourke/prolection/coords) on Nov. 5, 2004; Jun. 1996.
Burstone; Dr. Charles J. Burstone on the Uses of the Computer in Orthodontic Practice (Part 1); Journal of Clinical Orthodontics; 13(7); pp. 442-453; (interview); Jul. 1979.
Cadent Inc.; OrthoCAD ABO user guide; 38 pages; Dec. 21, 2005.
Cadent Inc.; Reviewing and modifying an orthoCAD case; 4 pages; Feb. 14, 2005.
Carnaghan, An Alternative to Holograms for the Portrayal of Human Teeth; 4th Int'l Conf. on Holographic Systems, Components and Applications; pp. 228-231; Sep. 15, 1993.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Daniels et al.; The development of the index of complexity outcome and need (ICON); British Journal of Orthodontics; 27(2); pp. 149-162; Jun. 2000.
Dentrac Corporation; Dentrac document; pp. 4-13; (year of pub. sufficiently earlier than effective US filing date and any foreign priority date) 1992.
Dentrix; Dentrix G3, new features; 2 pages; retrieved from the Internet (http://www.dentrix.com/g3/new_features/index.asp); on Jun. 6, 2008.
Dicom to surgical guides; (Screenshot)1 page; retrieved from the internet at YouTube (https://youtu.be/47KtOmCEFQk); Published Apr. 4, 2016.
Di Giacomo et al.; Clinical application of sterolithographic surgical guides for implant placement: Preliminary results; Journal Periodontolgy; 76(4); pp. 503-507; Apr. 2005.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
English translation of Japanese Laid-Open Publication No. 63-11148 to inventor T. Ozukuri (Laid-Open on Jan. 18, 1998) pp. 1-7.
Friedrich et al; Measuring system for in vivo recording of force systems in orthodontic treatment-concept and analysis of accuracy; J. Biomech.; 32(1); pp. 81-85; (Abstract Only) Jan. 1999.
Gansky; Dental data mining: potential pitfalls and practical issues; Advances in Dental Research; 17(1); pp. 109-114; Dec. 2003.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Geomagic; Dental reconstruction; 1 page; retrieved from the internet (http://geomagic.com/en/solutions/industry/detal_desc.php) on Jun. 6, 2008.
Gim-Alldent Deutschland, "Das DUX System: Die Technik," 3 pages; (English Translation Included); (year of pub. sufficiently earlier than effective US filing date and any foreign priority date); 2002.
Gottschalk et al.; OBBTree: A hierarchical structure for rapid interference detection; 12 pages; (http://www.cs.unc.edu/?geom/OBB/OBBT.html); retieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Grest, Daniel; Marker-Free Human Motion Capture in Dynamic Cluttered Environments from a Single View-Point, PhD Thesis; 171 pages; Dec. 2007.
Heaven et al.; Computer-Based Image Analysis of Artificial Root Surface Caries; Abstracts of Papers #2094; Journal of Dental Research; 70:528; (Abstract Only); Apr. 17-21, 1991.

(56) References Cited

OTHER PUBLICATIONS

Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa..); on Nov. 5, 2004.

Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.

Invisalign; You were made to move. There's never been a better time to straighten your teeth with the most advanced clear aligner in the world; Product webpage; 2 pages; retrieved from the internet (www.invisalign.com/) on Dec. 28, 2017.

Karaman et al.; A practical method of fabricating a lingual retainer; Am. Journal of Orthodontic and Dentofacial Orthopedics; 124(3); pp. 327-330; Sep. 2003.

Kochanek; Interpolating Splines with Local Tension, Continuity and Bias Control; Computer Graphics; 18(3); pp. 33-41; Jan. 1, 1984.

Mantzikos et al.; Case report: Forced eruption and implant site development; The Angle Orthodontist; 68(2); pp. 179-186; Apr. 1998.

McNamara et al.; Orthodontic and Orthopedic Treatment in the Mixed Dentition; Needham Press; pp. 347-353; Jan. 1993.

Methot; Get the picture with a gps for smile design in 3 steps; Spectrum; 5(4); pp. 100-105; (year of pub. sufficiently earlier than effective US filing date and any foreign priority date) 2006.

Moles; Correcting Mild Malalignments—As Easy As One, Two, Three; AOA/Pro Corner; 11(2); 2 pages; (year of pub. sufficiently earlier than effective US filing date and any foreign priority date) 2002.

Newcombe; DTAM: Dense tracking and mapping in real-time; 8 pages; retrieved from the internet (http://www.doc.ic.ac.uk/?ajd/Publications/newcombe_etal_iccv2011.Pdf; on Dec. 2011.

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3); pp. 219-228; Mar. 2004.

Ogimoto et al.; Pressure-pain threshold determination in the oral mucosa; Journal of Oral Rehabilitation; 29(7); pp. 620-626; Jul. 2002.

ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.

OrthoCAD downloads; retrieved Jun. 27, 2012 from the internet (www.orthocad.com/download/downloads.asp); 2 pages; Feb. 14, 2005.

Page et al.; Validity and accuracy of a risk calculator in predicting periodontal disease; Journal of the American Dental Association; 133(5); pp. 569-576; May 2002.

Patterson Dental; Cosmetic imaging; 2 pages retrieved from the internet (http://patterson.eaglesoft.net/cnt_di_cosimg.html) on Jun. 6, 2008.

Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

Rekow et al.; CAD/CAM for Dental Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rose et al.; The role of orthodontics in implant dentistry; British Dental Journal; 201(12); pp. 753-764; Dec. 23, 2006.

Sahm et al.; "Micro-Electronic Monitoring of Functional Appliance Wear"; Eur J Orthod.; 12(3); pp. 297-301; Aug. 1990.

Sahm; Presentation of a wear timer for the clarification of scientific questions in orthodontic orthopedics; Fortschritte der Kieferorthopadie; 51 (4); pp. 243-247; (Translation Included) Jul. 1990.

Sarment et al.; Accuracy of implant placement with a sterolithographic surgical guide; journal of Oral and Maxillofacial Implants; 118(4); pp. 571-577; Jul. 2003.

Siemens; CEREC—Computer-Reconstruction, High Tech in der Zahnmedizin; 15 pagesI: (Includes Machine Translation); (year of pub. sufficiently earlier than effective US filing date and any foreign priority date); 2004.

Smalley; Implants for tooth movement: Determining implant location and orientation: Journal of Esthetic and Restorative Dentistry; 7(2); pp. 62-72; Mar. 1995.

Smart Technology; Smile library II; 1 page; retrieved from the internet (http://smart-technology.net/) on Jun. 6, 2008.

Smile-VISION_The smile-vision cosmetic imaging system; 2 pages; retrieved from the internet (http://www.smile-vision.net/cos_imaging.php) on Jun. 6, 2008.

Sturman; Interactive Keyframe Animation of 3-D Articulated Models; Proceedings Graphics Interface '84; vol. 86; pp. 35-40; May-Jun. 1984.

Szeliski; Introduction to computer vision: Structure from motion; 64 pages; retrieved from the internet (http://robots.stanford.edu/cs223b05/notes/Cs%20223-B%20L10%structurefrommotion1b.ppt, on Feb. 3, 2005.

The American Heritage, Stedman's Medical Dictionary; Gingiva; 3 pages; retrieved from the interent (http://reference.com/search/search?q=gingiva) on Nov. 5, 2004.

Thera Mon; "Microsensor"; 2 pages; retrieved from the internet (www.english.thera-mon.com/the-product/transponder/index.html); on Sep. 19, 2016.

Thorlabs; Pellin broca prisms; 1 page; retrieved from the internet (www.thorlabs.com); Nov. 30, 2012.

Tiziani et al.; Confocal principle for macro and microscopic surface and defect analysis; Optical Engineering; 39(1); pp. 32-39; Jan. 1, 2000.

Tru-Tatn Orthodontic & Dental Supplies, Product Brochure, Rochester, Minnesota 55902, 16 pages; (year of pub. sufficiently earlier than effective US filing date and any foreign priority date) 1996.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Verstreken et al.; An Image-Guided Planning System for Endosseous Oral Implants; IEEE Transactions on Medical Imaging; 17(5); pp. 842-852; Oct. 1998.

Vevin et al.; Pose estimation of teeth through crown-shape matching; In Medical Imaging: Image Processing of International Society of Optics and Photonics; vol. 4684; pp. 955-965; May 9, 2002.

Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.

Watson et al.; Pressures recorded at te denture base-mucosal surface interface in complete denture wearers; Journal of Oral Rehabilitation 14(6); pp. 575-589; Nov. 1987.

Wiedmann; According to the laws of harmony to find the right tooth shape with assistance of the computer; Digital Dental News; 2nd Vol.; pp. 0005-0008; (English Version Included); Apr. 2008.

(56) References Cited

OTHER PUBLICATIONS

Wikipedia; Palatal expansion; 3 pages; retrieved from the internet (https://en.wikipedia.org/wiki/Palatal_expansion) on Mar. 5, 2018.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yaltara Software; Visual planner; 1 page; retrieved from the internet (http://yaltara.com/vp/) on Jun. 6, 2008.
Yamada et al.; Simulation of fan-beam type optical computed-tomography imaging of strongly scattering and weakly absorbing media; Applied Optics; 32(25); pp. 4808-4814; Sep. 1, 1993.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Zhang et al.; Visual speech features extraction for improved speech recognition; 2002 IEEE International conference on Acoustics, Speech and Signal Processing; vol. 2; 4 pages; May 13-17, 2002.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl No. 16/231,906 entitled "Augmented reality enhancements for dental practitioners." filed Dec. 24, 2018.
Kopleman et al., U.S. Appl No. 16/220,381 entitled "Closed loop adaptive orthodontic treatment methods and apparatuses," filed Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.

\* cited by examiner

DENTAL APPLIANCE REINFORCEMENT

CROSS-REFERENCES TO RELATED APPLICATIONS

This application is related to commonly-owned U.S. application Ser. No. 10/718,779 filed Nov. 20, 2003, which is a continuation of U.S. application Ser. No. 09/686,190 filed Oct. 10, 2000 (now abandoned), which is a continuation of U.S. application Ser. No. 09/169,276 filed on Oct. 8, 1998, and to U.S. application Ser. No. 09/169,036 filed Oct. 8, 1998 (now U.S. Pat. No. 6,450,807), the full disclosures of which are incorporated herein by reference.

BACKGROUND OF THE DISCLOSURE

The present disclosure relates generally to dental treatment. In some types of dental treatment, a patient's teeth can be moved from an initial to a final position using any of a variety of appliances. An appliance can be used to exert force on the teeth by which one or more of them are moved or held in place, as appropriate to the stage of treatment. In some instances, the appliance may lose some of its ability to impart force due to a relaxation of the materials used to form the appliance. Such relaxation may be due to the application of force over time, may be due to inherent properties in the material, and/or by materials provided in conjunction with or used in parallel with an appliance, among other causes. This relaxation may reduce the effectiveness of the appliance, in some instances.

DETAILED DESCRIPTION

In the embodiments of the present disclosure, appliances, systems, and methods are provided for defining appliance configurations or changes to appliance configurations for incrementally moving teeth. For example, in some embodiments, the appliance can include one or more ribs that can be provided, for example, to reinforce the structure of at least a portion of the appliance with respect to various forces that may be applied thereto. In some embodiments, the tooth movements can be those normally associated with orthodontic treatment, including translation in three orthogonal directions relative to a vertical centerline, rotation of the tooth centerline in the two orthodontic directions ("root angulation" and "torque"), as well as rotation about the centerline.

Figure 1:
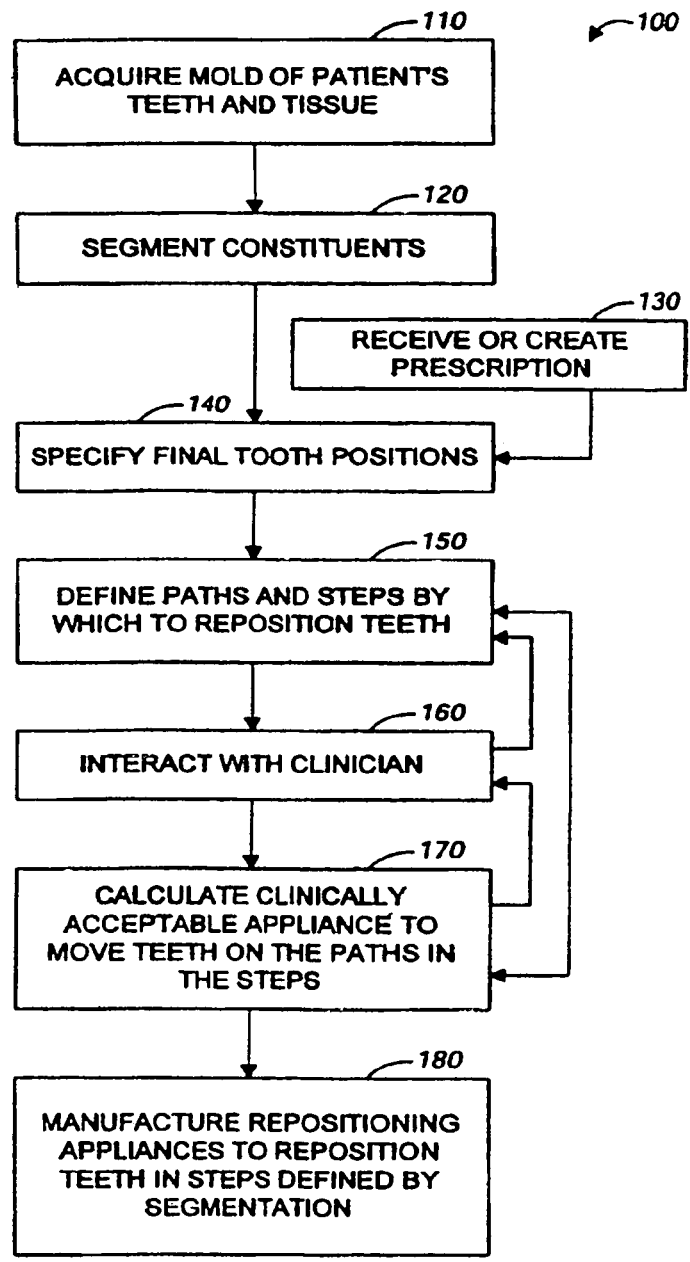
FIG. 1 is a flowchart of a process of specifying a course of treatment including a subprocess for calculating aligner shapes in accordance with the embodiments of the present disclosure.

FIG. 1 illustrates the general flow of an example dental process 100 for defining and generating repositioning appliances for orthodontic treatment of a patient. The process 100 includes a method, and is suitable for the apparatus, of embodiments of the present disclosure, as will be described. The computational steps of the process can be advantageously implemented, for example, as computing device program modules for execution on one or more conventional computing devices.

As an initial step, in some embodiments, a mold or a scan of patient's teeth or mouth tissue can be acquired (110). This step can, for example, involve taking one or more casts of one or more of the patient's teeth and/or gums, and may also involve taking wax bites, direct contact scanning, x-ray imaging, tomographic imaging, sonographic imaging, and/or other techniques for obtaining information about the position and structure of the teeth, jaws, gums and/or other orthodontically relevant tissue. From the data so obtained, a digital data set can be derived that represents the initial (e.g., pretreatment) arrangement of the patient's teeth and/or other tissues.

The initial digital data set, which may include both raw data from scanning operations and/or data representing surface models derived from the raw data, can be processed to segment the tissue constituents from each other (step 120). In particular, for example, in this step, data structures that digitally represent individual tooth crowns can be produced. Advantageously, in some embodiments, digital models of entire teeth can be produced, including measured or extrapolated hidden surfaces and root structures.

The desired final position of the teeth, that is, the desired and/or intended end result of orthodontic treatment, can be received from a clinician in the form of a prescription, can be calculated from basic orthodontic principles, and/or can be extrapolated computationally from a clinical prescription (step 130), among other sources of the final position. With a specification of the desired final positions of the teeth and a digital representation of the teeth themselves, the final position and/or surface geometry of each tooth can be specified (step 140) to form a complete model of the teeth at the desired end of treatment. Generally, in this step, the position of every tooth can be specified, in such embodiments. The result of this step is a set of digital data structures that represents an orthodontically correct repositioning of the modeled teeth relative to presumed-stable tissue. In some embodiments, the teeth and tissue are both represented as digital data.

Having both a beginning position and a final position for a tooth, the process next defines a tooth path for the motion of the teeth. The tooth paths can be optimized in the aggregate so that the teeth can be moved in the quickest fashion with the least amount of round-tripping to bring the teeth from their initial positions to their desired final positions. (Round-tripping is any motion of a tooth in any direction other than directly toward the desired final position. Round-tripping is sometimes necessary to allow teeth to move past each other.)

In some processes, the tooth paths are segmented. In such embodiments, the segments are calculated so that each tooth's motion within a segment stays within threshold limits of linear and rotational translation. In this way, the end points of each path segment can constitute a clinically viable repositioning, and the aggregate of segment end points constitute a clinically viable sequence of tooth positions, so that moving from one point to the next in the sequence does not result in a collision of teeth.

In embodiments such as FIG. 1, the threshold limits of linear and rotational translation can be initialized, in one implementation, with default values based on the nature of the appliance to be used. More individually tailored limit values can be calculated using patient-specific data. The limit values can also be updated based on the result of an appliance-calculation (step 170, described later), which may determine that at one or more points along one or more tooth paths, the forces that can be generated by the appliance on the then-existing configuration of teeth and tissue is incapable of effecting the repositioning that is represented by one or more tooth path segments. With this information, the subprocess defining segmented paths (step 150) can recalculate the paths or the affected subpaths.

At various stages of the process, for example, after the segmented paths have been defined, the process can interact with a clinician responsible for the treatment of the patient (step 160). Clinician interaction can be implemented using a client process programmed to receive tooth positions and models, as well as path information from a server computer or process in which other steps of process 100 are implemented. The client process can be advantageously programmed to allow the clinician to display an animation of the positions and paths and to allow the clinician to reset the final positions of one or more of the teeth and to specify constraints to be applied to the segmented paths. If the clinician makes any such changes, the subprocess of defining segmented paths (step 150) can, in some embodiments, be performed again.

The segmented tooth paths and associated tooth position data can be used to calculate clinically acceptable appliance configurations (or successive changes in appliance configuration) that can move the teeth on the defined treatment path in the steps specified by the path segments (step 170). Each appliance configuration represents a step along the treatment path for the patient. The steps can be defined and calculated so that each discrete position can follow by straight-line tooth movement or simple rotation from the tooth positions achieved by the preceding discrete step and so that the amount of repositioning required at each step can involve an orthodontically appropriate amount of force on the patient's dentition. As with the path definition step, this appliance calculation step can include interactions and even iterative interactions with the clinician (step 160). The operation of a process step such as step 200 implementing this calculation step will be described more fully below.

Having calculated appliance definitions, the process 100 can proceed to the manufacturing step (step 180) in which appliances defined by the process are manufactured, or electronic or printed information is produced that can be used by a manual or automated process to define appliance configurations or changes to appliance configurations.

Figure 2:
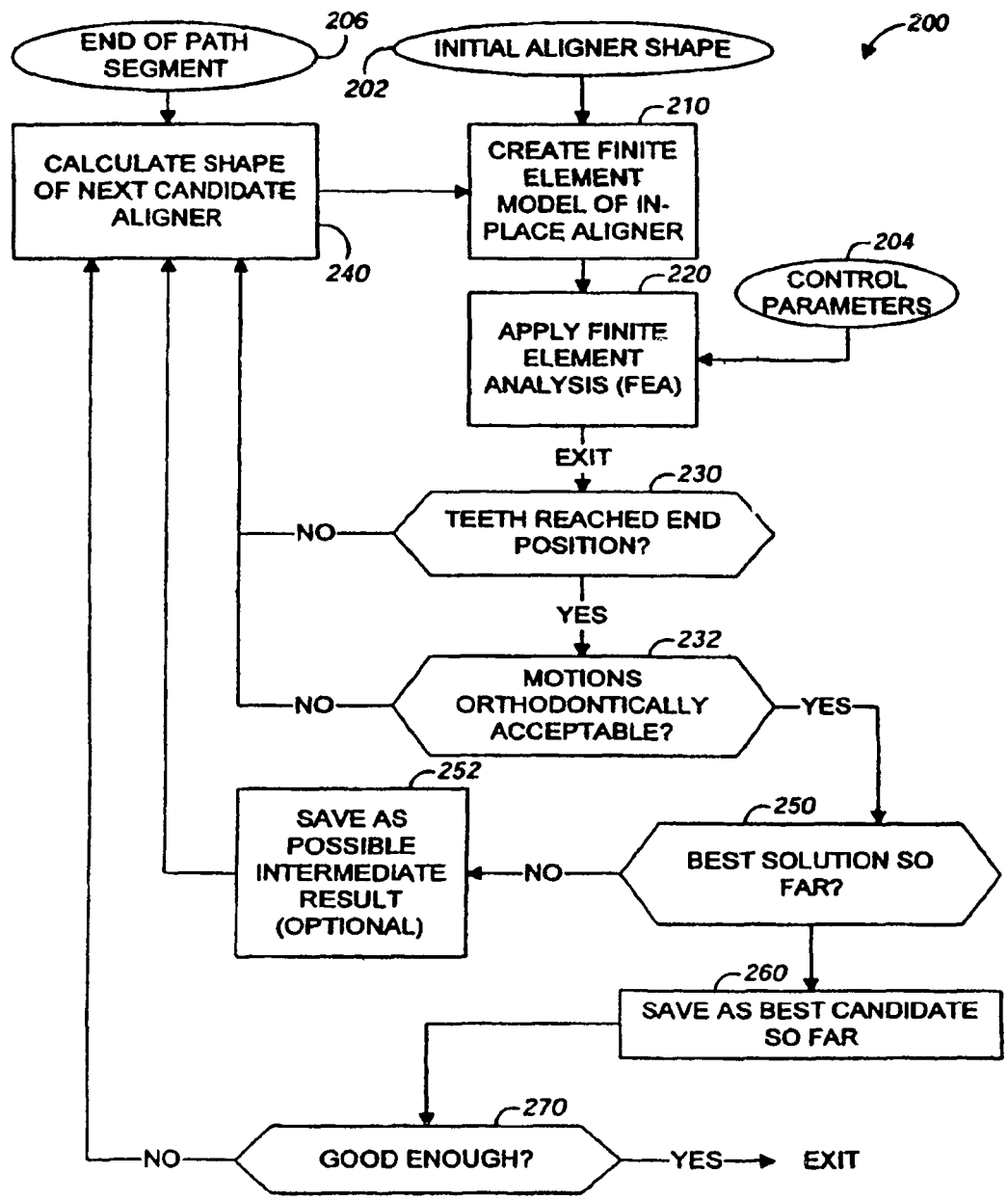
FIG. 2 is a flowchart of a process for calculating aligner shapes according to an embodiment of the present disclosure.

FIG. 2 illustrates a process 200 implementing an appliance-calculation step (FIG. 1, step 170) for polymeric shell aligners of the kind described in U. S. patent application Ser. No. 09/745,825, filed Dec. 21, 2000. Inputs to the process can, for example, include an initial aligner shape 202, various control parameters 204, and a desired end configuration for the teeth at the end of the current treatment path segment 206. Other inputs can include digital models of the teeth in position in the jaw, models of the jaw tissue, and specifications of an initial aligner shape and of the aligner material. Using such input data, the process can create a finite element model of the aligner, teeth, and/or tissue, with the aligner in place on the teeth (step 210). Next, the process can apply a finite element analysis to the composite finite element model of aligner, teeth, and/or tissue (step 220). The analysis can run until an exit condition is reached, at which time, in some embodiments, the process can evaluate whether the teeth have reached the desired end position for the current path segment, or a position sufficiently close to the desired end position (step 230). In such embodiments, if an acceptable end position is not reached by the teeth, the process can, in some instances, calculate a new candidate aligner shape (step 240). If an acceptable end position is reached, in some embodiments, the motions of the teeth can be calculated by the finite elements analysis are evaluated to determine whether they are orthodontically acceptable (step 232). If they are not, in some embodiments, the process also proceeds to calculate a new candidate aligner shape (step 240). If the motions are orthodontically acceptable and the teeth have reached an acceptable position, the current aligner shape is compared to the previously calculated aligner shapes. In various embodiments, if the current shape is determined to be the best solution so far (decision step 250), it can be saved as the best candidate so far (step 260). In some such embodiments, if not, it can be saved in an optional step as a possible intermediate result (step 252). If the current aligner shape is the best candidate so far, the process can be used to determine whether it is good enough to be accepted (decision step 270). If it is, the process exits. Otherwise, the process can continue and calculate another candidate shape (step 240) for analysis.

The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. or SolidWorks, discussed below. For creating finite element models and analyzing them, program products from a number of vendors can be used, including the PolyFEM product available from CADSI of Coralville, Iowa, the Pro/Mechanica simulation software available from Parametric Technology Corporation of Needham, Mass., the I-DEAS design software products available from Structural Dynamics Research Corporation (SDRC) of Cincinnati, Ohio, and the MSC/NASTRAN product available from MacNeal-Schwendler Corporation of Los Angeles, Calif. Other programs that can be utilized in various embodiments include SolidWorks® available from SolidWorks Corporation of Concord, Mass. and ProEngineerg available from Parametric Technology Corporation of Needham, Mass., among others.

Figure 3:
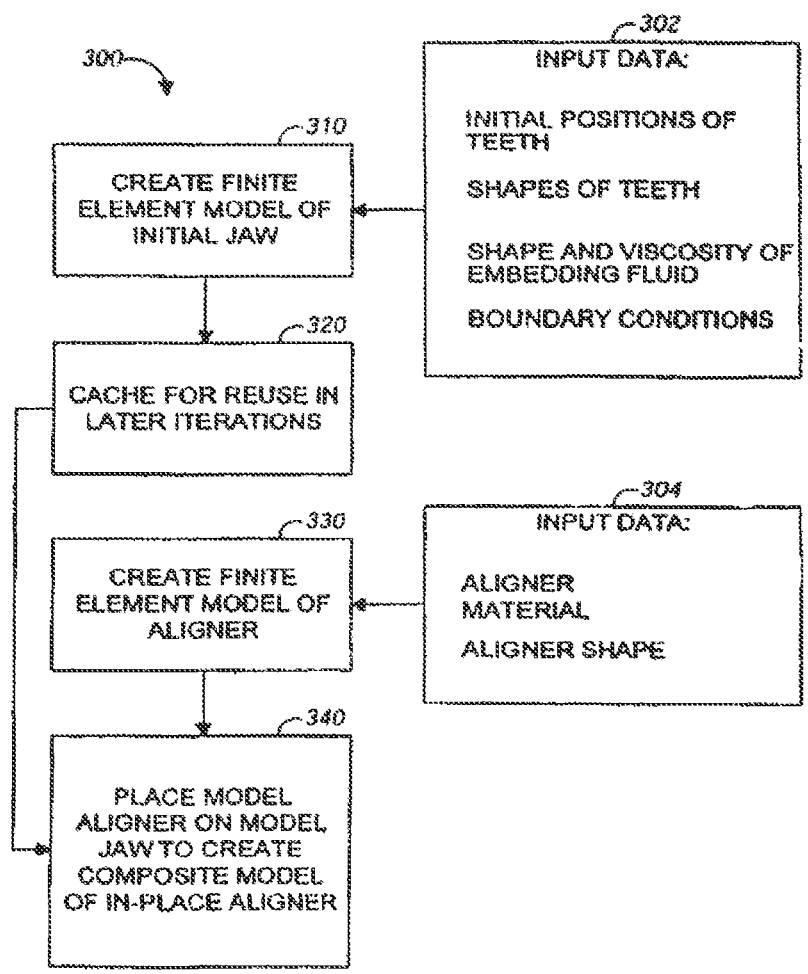
FIG. 3 is a flowchart of a subprocess for creating finite element models according to an embodiment of the present disclosure.

FIG. 3 shows a process 300 of creating a finite element model that can be used to perform step 210 of the process 200 (FIG. 2). In the illustrated embodiment, input to the model creation process 300 includes input data 302 describing the teeth and tissues and input data 304 describing the aligner. The input data describing the teeth 302 can, for example, include the digital models of the teeth; digital models of rigid tissue structures, if available; shape and viscosity specifications for a highly viscous fluid modeling the substrate tissue in which the teeth are embedded and to which the teeth are connected, in the absence of specific models of those tissues; and/or boundary conditions specifying the immovable boundaries of the model elements. In one implementation, the model elements include only models of the teeth, a model of a highly viscous embedding substrate fluid, and boundary conditions that define, in effect, a rigid container in which the modeled fluid is held.

A finite element model of the initial configuration of the teeth and/or tissue can be created (step 310) and optionally cached for reuse in later iterations of the process (step 320). As was done with the teeth and tissue, a finite element model can be created of the polymeric shell aligner (step 330). The input data for this model can include data specifying the material of which the aligner is made and/or the shape of the aligner (data input 304).

The model aligner can then be computationally manipulated to place it over the modeled teeth in the model jaw to create a composite model of an in-place aligner (step 340). Optionally, the forces required to deform the aligner to fit over the teeth, including any hardware attached to the teeth, can be computed and, for example, used as a figure of merit in measuring the acceptability of the particular aligner configuration. In an alternative, however, the aligner deformation can be modeled by applying enough force to its insides to make it large enough to fit over the teeth, placing the model aligner over the model teeth in the composite model, setting the conditions of the model teeth and tissue to be infinitely rigid, and/or allowing the model aligner to relax into position over the fixed teeth. The surfaces of the aligner and the teeth can be modeled to interact without friction at this stage, so that the aligner model achieves the correct initial configuration over the model teeth before finite element analysis is begun to find a solution to the composite model and/or compute the movement of the teeth under the influence of the distorted aligner.

In various embodiments where a number of ribs are provided, the ribs can be modeled digitally and/or the force calculations can be adjusted or calculated differently to account for the changes in force the ribs may provide. Such changes may allow a tooth to be moved more quickly, a tooth position to be maintained against greater or longer duration force, and/or moved for a longer duration.

Figure 4:
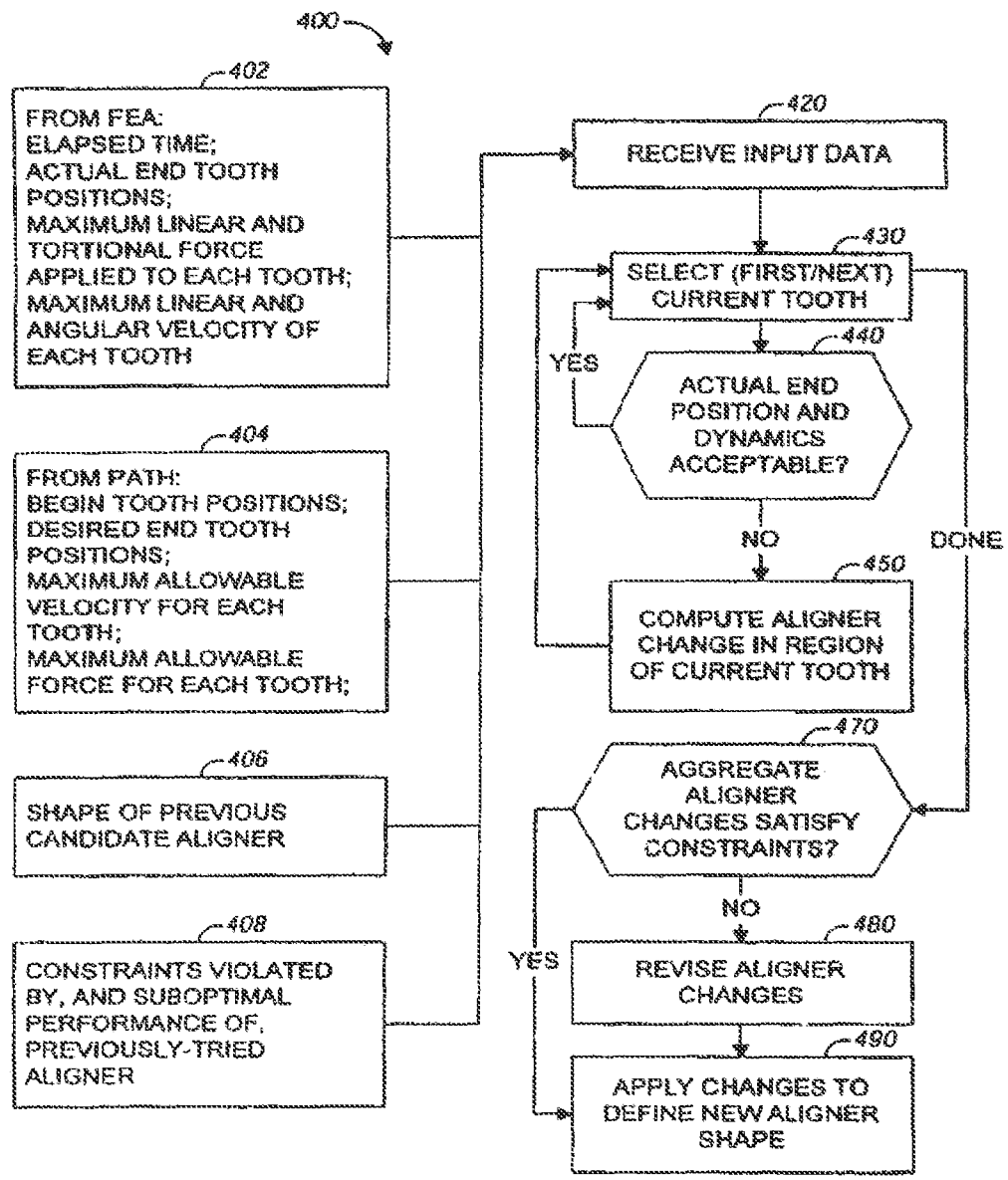
FIG. 4 is a flowchart of a subprocess for computing aligner changes according to an embodiment of the present disclosure.

FIG. 4 shows a process 400 for calculating the shape of a next aligner that can be used in the aligner calculations, step 240 of process 200 (FIG. 2). A variety of inputs can be used to calculate the next candidate aligner shape. These include inputs 402 of data generated by the finite element analysis solution of the composite model and/or data 404 defined by the current tooth path, among other information. The data 402 derived from the finite element analysis can, for example, include the amount of real elapsed time over which the simulated repositioning of the teeth took place; the actual end tooth positions calculated by the analysis; the maximum linear and torsional force applied to each tooth; and/or the maximum linear and angular velocity of each tooth. From the input path information, the input data 404 can, for example, include the initial tooth positions for the current path segment, the desired tooth positions at the end of the current path segment, the maximum allowable displacement velocity for each tooth, and/or the maximum allowable force of each kind for each tooth.

If a previously evaluated aligner was found to violate one or more constraints, additional input data 406 can be used by the process 400. This data 406 can include information identifying the constraints violated by, and any identified suboptimal performance of, the previously evaluated aligner.

Having received initial input data (step 420), the process can iterate over the movable teeth in the model. (Some of the teeth may be identified as, and constrained to be, immobile.) If the end position and/or dynamics of motion of the currently selected tooth by the previously selected aligner are acceptable ("yes" branch of decision step 440), the process can continue, for example, by selecting for consideration a next tooth (step 430) until all teeth have been considered ("done" branch from step 430 to step 470). Otherwise ("no" branch from step 440), a change in the aligner can be calculated in the region of the currently selected tooth (step 450). The process then can move back to select the next current tooth (step 430) as has been described.

In some embodiments, when all of the teeth have been considered, the aggregate changes made to the aligner can be evaluated against previously defined constraints (step 470), examples of which have already been mentioned. Constraints can be defined with reference to a variety of further considerations, such as manufacturability. For example, constraints can be defined to set a maximum and/or minimum thickness of the aligner material, and/or to set a maximum and/or minimum coverage of the aligner over the crowns of the teeth. In such embodiments, if the aligner constraints are satisfied, the changes are applied to define a new aligner shape (step 490). In some such embodiments, the changes to the aligner are revised to satisfy the constraints (step 480), and the revised changes are applied to define the new aligner shape (step 490).

Figure 5A:
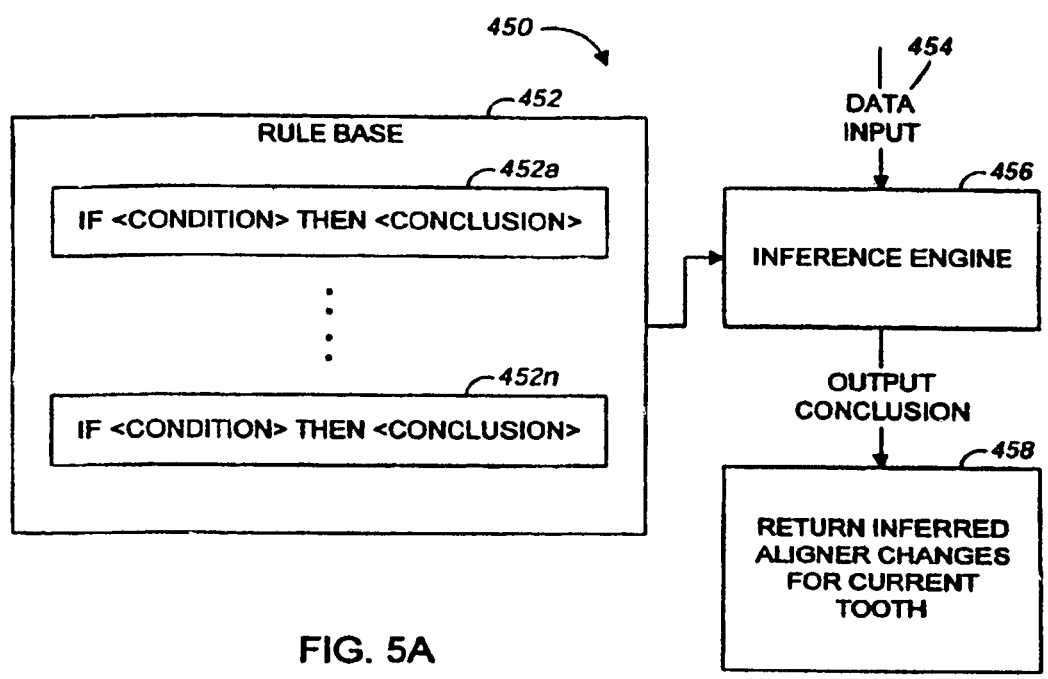
FIG. 5A is a flowchart of a subprocess for calculating changes in aligner shape according to an embodiment of the present disclosure.

FIG. 5A illustrates one implementation of the step of computing an aligner change in a region of a current tooth (step 450). In this implementation, a rule-based inference engine 456 can be used to process the input data previously described (input 454) and/or a set of rules 452a-452n in a rule base of rules 452. The inference engine 456 and the rules 452 can be used to define a production system which, when applied to the factual input data, can be used to produce a set of output conclusions that specify the changes to be made to the aligner in the region of the current tooth (output 458).

Rules 452 have the conventional two-part form: an if-part defining a condition and a then-part defining a conclusion or action that is asserted if the condition is satisfied. Conditions can be simple or they can be complex conjunctions or disjunctions of multiple assertions. An example set of rules, which defines changes to be made to the aligner, can, for example, include the following: if the motion of the tooth is too slow, add driving material to the aligner opposite the desired direction of motion; if the motion of the tooth is too slow, add driving material to overcorrect the position of the tooth; if the tooth is too far short of the desired end position, add material to overcorrect; if the tooth has been moved too far past the desired end position, add material to stiffen the aligner where the tooth moves to meet it; if a maximum amount of driving material has been added, add material to overcorrect the repositioning of the tooth and do not add driving material; and/or if the motion of the tooth is in a direction other than the desired direction, remove and add material so as to redirect the tooth, among other rules.

Figure 5B:
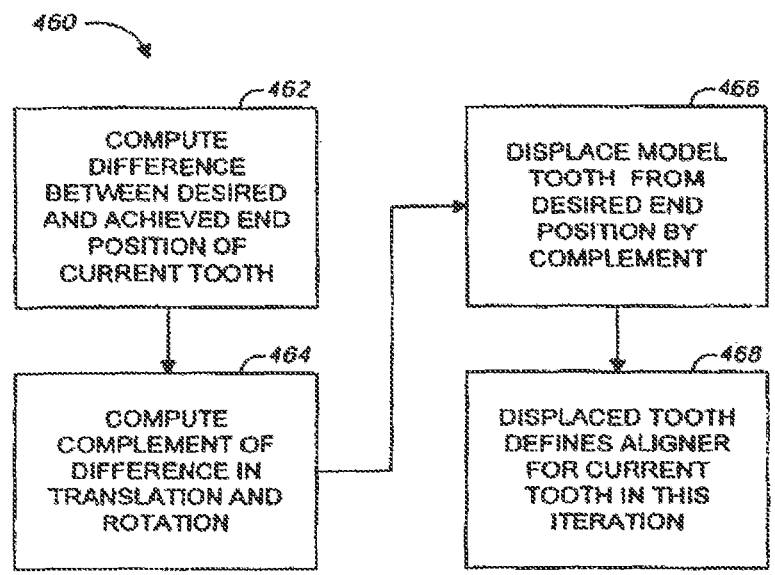
FIG. 5B is a flowchart of a subprocess for calculating changes in aligner shape according to an embodiment of the present disclosure.
Figure 5C:
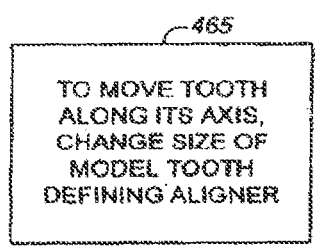
FIG. 5C is a flowchart of a subprocess for calculating changes in aligner shape according to an embodiment of the present disclosure.

In another embodiment, illustrated in FIGS. 5B and 5C, an absolute configuration of the aligner can be computed, rather than an incremental difference. As shown in FIG. 5B, a process 460 can be used to compute an absolute configuration for an aligner in a region of a current tooth. Using input data that has already been described, such a process can compute the difference between the desired end position and the achieved end position of the current tooth (462). Using the intersection of the tooth center line with the level of the gum tissue as the point of reference, such a process can compute the complement of the difference in any or all six degrees of freedom of motion, namely three degrees of translation and/or three degrees of rotation (step 464). Next, in some embodiments, the model tooth can be displaced from its desired end position by the amounts of the complement differences (step 466), which is illustrated in FIG. 5D.

Figure 5D:
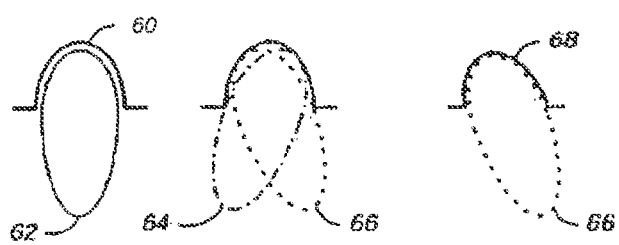
FIG. 5D is a schematic illustrating the operation of the subprocess of FIG. 5B.

FIG. 5D shows a planar view of an illustrative model aligner 60 over an illustrative model tooth 62. The tooth is illustrated in its desired end position and the aligner shape is illustrated as being defined by the tooth in this end position. The actual motion of the tooth calculated by the finite element analysis can be illustrated as placing the tooth in position 64 rather than in the desired position 62. A complement of the computed end position can be illustrated as position 66. The next step of process 460 (FIG. 5B) defines the aligner in the region of the current tooth in this iteration of the process by the position of the displaced model tooth (step 468) calculated in the preceding step (466). This computed aligner configuration in the region of the current tooth is illustrated in FIG. 5D as shape 68 which is defined by the repositioned model tooth in position 66.

A step in process 460, which can also be implemented as a rule 452 (FIG. 5A), is shown in FIG. 5C. To move the current tooth in the direction of its central axis, the size of the model tooth defining that region of the aligner, or the amount of room allowed in the aligner for the tooth, can be made smaller in the area away from which the process has decided to move the tooth (step 465).

Figure 6:
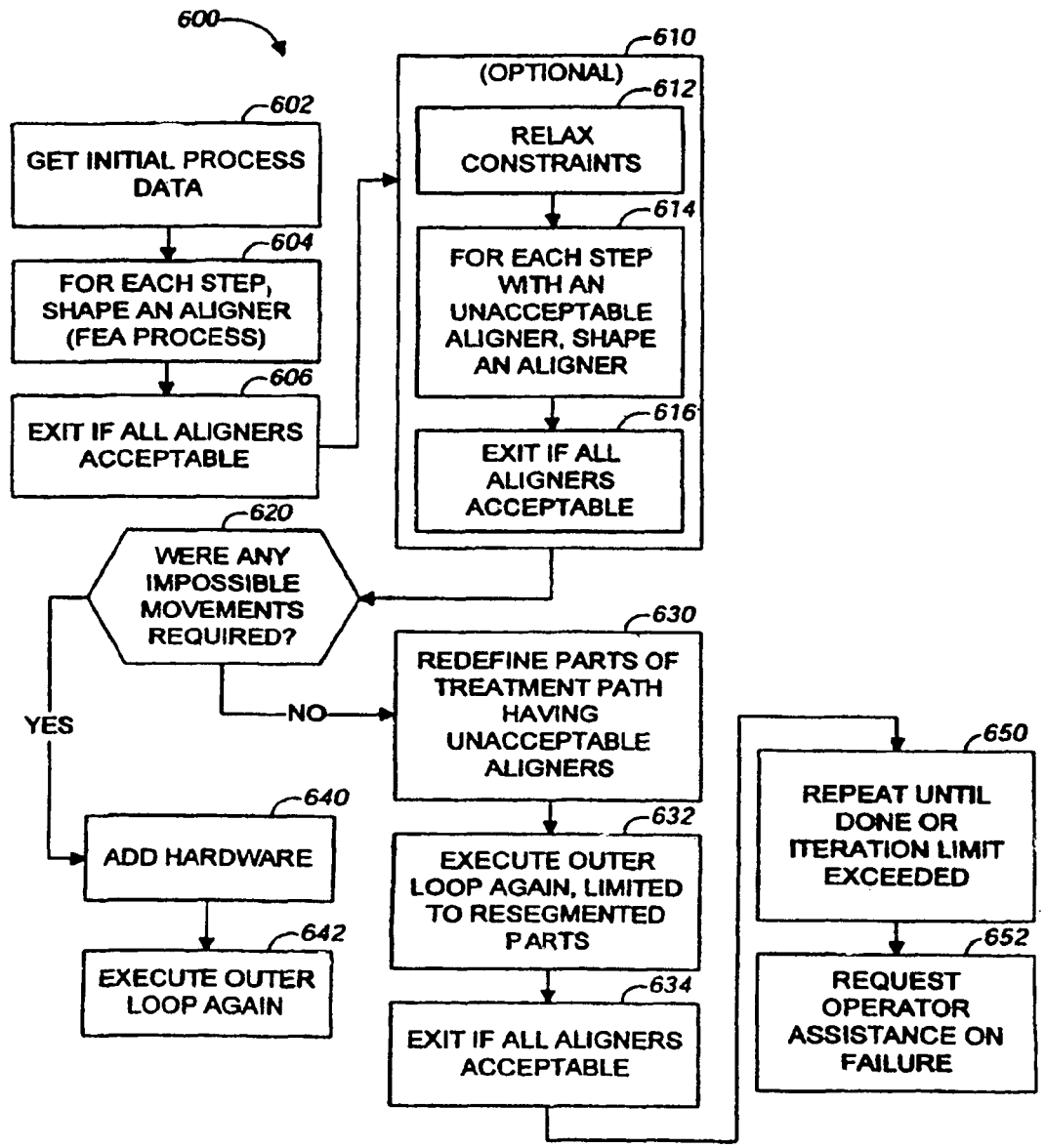
FIG. 6 is a flowchart of a process for computing shapes for sets of aligners according to an embodiment of the present disclosure.

As shown in FIG. 6, the process 200 of computing the shape for an aligner for a step in a treatment path can be one step in an overall process 600 of computing the shapes of a series of aligners. This overall process 600 can, for example, begin with an initialization step 602 in which initial data, control, and/or constraint values can be obtained.

In some embodiments, when an aligner configuration has been found for each step or segment of the treatment path (step 604), the overall process 600 can be used to determine whether one or more of the aligners are acceptable (step 606). In some embodiments, if they are, the process exits and is complete. In some embodiments, the process can undertake a set of steps 610 in an attempt to calculate a set of acceptable aligners. In such embodiments the process can, relax one or more of the constraints on the aligners (step 612). Then, for each path segment with an unacceptable aligner, the process 200 of shaping an aligner can be performed with the new constraints (step 614). If the aligners are now acceptable, the overall process 600 can be exited (step 616).

Aligners may be unacceptable for a variety of reasons, some of which can be handled by the overall process in such embodiments. For example, if any impossible movements were required (decision step 620), that is, if the shape calculation process 200 was required to effect a motion for which no rule or adjustment was available, the process 600 can proceed to execute a module that can calculate the configuration of a hardware attachment to the subject tooth to which forces can be applied to effect such a required motion (step 640). Because adding hardware can have an effect that is more than local, when hardware is added to the model, in such instances, the outer loop of the overall process 600 can be executed again (step 642).

If no impossible movements were required ("no" branch from step 620), the process can transfer control to a path definition process (such as step 150, FIG. 1) to redefine those parts of the treatment path having unacceptable aligners (step 630). This step can include both changing the increments of tooth motion, i.e., changing the segmentation, on the treatment path, changing the path followed by one or more teeth in the treatment path, or both. In such embodiments, after the treatment path has been redefined, the outer loop of the overall process can be executed again (step 632). In some embodiments, the recalculation can be advantageously limited to recalculating only those aligners on the redefined portions of the treatment path. If all the aligners are now acceptable, the overall process can be exited (step 634). If unacceptable aligners still remain, the overall process can be repeated until an acceptable set of aligners is found or an iteration limit is exceeded (step 650). At this point, as well as at other points in the processes that are described in this specification, such as at the computation of additional hardware (step 640), the process can interact with a human operator, such as a clinician or technician, to request assistance (step 652). Assistance that an operator provides can include, for example, defining or selecting suitable attachments to be attached to a tooth and/or a bone, defining an added elastic element to provide a needed force for one or more segments of the treatment path, suggesting an alteration to the treatment path, either in the motion path of a tooth and/or in the segmentation of the treatment path, and/or approving a deviation from or relaxation of an operative constraint.

As was mentioned above, the overall process 600 can be defined and parameterized by various items of input data (step 602). In one implementation, this initializing and defining data includes the following items: an iteration limit for the outer loop of the overall process; specification of figures of merit that are calculated to determine whether an aligner is good enough (see FIG. 2, step 270); a specification of the aligner material; a specification of the constraints that the shape or configuration of an aligner must satisfy to be acceptable; a specification of the forces and positioning motions and velocities that are orthodontically acceptable; an initial treatment path, which includes the motion path for each tooth and a segmentation of the treatment path into segments, each segment to be accomplished by one aligner; a specification of the shapes and positions of any anchors installed on the teeth or otherwise; and a specification of a model for the jaw bone and other tissues in or on which the teeth are situated (in the implementation being described, this model includes of a model of a viscous substrate fluid in which the teeth are embedded and which has boundary conditions that essentially define a container for the fluid).

Figure 9:
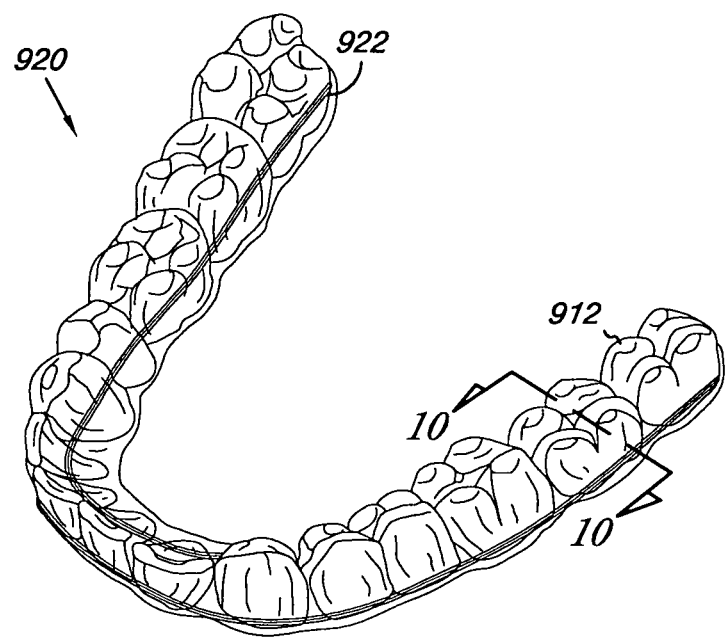
FIG. 9 illustrates an appliance having an inner and outer generally horizontal rib according to an embodiment of the present disclosure.
Figure 10:
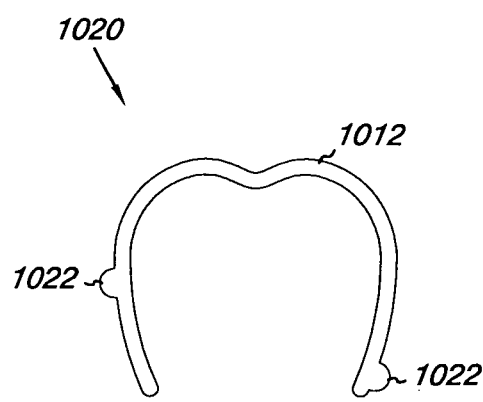
FIG. 10 illustrates an appliance cross-section illustrating the ribs as taken along line 10-10 of FIG. 9.

In various embodiments, other features can be added to the tooth model data sets to produce desired features in the aligners. For example, it may be desirable to add digital wax patches to define cavities or recesses to maintain a space between the aligner and particular regions of the teeth or jaw. It may also be desirable to add digital wax patches to define corrugated and/or other structural forms to create regions having particular stiffness and/or other structural properties. In manufacturing processes that rely on generation of positive models to produce the repositioning appliance, adding a wax patch to the digital model can be used to generate a positive mold that has the same added wax patch geometry. This can be done globally in defining the base shape of the aligners or in the calculation of particular aligner shapes. One feature that can be added, for example, is a rim around the gumline, which can be produced by adding a digital model wire at the gumline of the digital model teeth from which the aligner is manufactured. When an aligner is manufactured by pressure fitting polymeric material over a positive physical model of the digital teeth, the wire along the gumlines can be used to cause the aligner to have a rim around it providing additional stiffness along the gumline. Such an embodiment is illustrated in FIGS. 9 and 10.

In another optional manufacturing technique, two sheets of material can be pressure fit over the positive tooth model, where one of the sheets is cut along the apex arch of the aligner and the other is overlaid on top. Such an embodiment can provide a double thickness of aligner material along the vertical walls of the teeth, among other benefits.

The changes that can be made to the design of an aligner are, in many instances, constrained by the manufacturing technique that will be used to produce it. For example, if the aligner will be made by pressure fitting a polymeric sheet over a positive model, the thickness of the aligner is often determined by the thickness of the sheet. As a consequence, a system embodiment may generally adjust the performance of the aligner by changing the orientation of the model teeth, the sizes of parts of the model teeth, the position and/or selection of attachments, and/or the addition and/or removal of material (e.g., adding wires or creating dimples) to change the structure of the aligner. In such embodiments, the system can be designed to adjust the aligner by specifying that one or more of the aligners are to be made of a sheet of a thickness other than the standard one, to provide more or less force to the teeth. On the other hand, if the aligner will be made by a rapid prototyping technique (e.g., additive manufacturing process), such as by a stereo lithography process, photo lithography process, fused deposition modeling, selective laser sintering, or other such process, the thickness of the aligner can be varied locally, and structural features such as rims, dimples, and corrugations can be added without modifying the digital model of the teeth. Such methods can be used to form ribs as described in further detail herein, for example.

Such a system can also be designed to be used to model the effects of more traditional appliances such as retainers and braces and therefore be used to generate optimal designs and treatment programs for particular patients.

The data processing aspects of one or more of the embodiments of the present disclosure can be implemented in digital electronic circuitry, or in computer hardware, firmware, software, or in combinations of them. Data processing apparatus of one or more of the embodiments of the present disclosure can be implemented in a computer program product tangibly embodied in a machine-readable storage device for execution by a programmable processor; and data processing method steps of one or more of the embodiments of the present disclosure can be performed by a programmable processor executing a program of instructions to perform functions of one or more embodiments of the present disclosure by operating on input data and/or generating output. The data processing aspects of one or more of the embodiments of the present disclosure can be implemented advantageously in one or more computer programs that are executable on a programmable system including at least one programmable processor coupled to receive data and/or instructions from and/or to transmit data and/or instructions to a data storage system, at least one input device, and/or at least one output device. Each computer program can be implemented in a high-level procedural and/or object-oriented programming language, and/or in assembly and/or machine language, if desired; and, in any case, the language can be a compiled and/or interpreted language. Suitable processors include, by way of example, general and special purpose microprocessors, among other logic processing structures. Generally, a processor can receive instructions and/or data from a read-only memory and/or a random access memory. Storage devices suitable for tangibly embodying computer program instructions and/or data include all forms of nonvolatile memory, including by way of example semiconductor memory devices, such as EPROM, EEPROM, and flash memory devices; magnetic disks such as internal hard disks and removable disks; magneto-optical disks; and CD-ROM disks, and other such media types.

Any of the foregoing can be supplemented by, or incorporated in, ASICs (application-specific integrated circuits).

To provide for interaction with a user, one or more of the embodiments of the present disclosure can be implemented using a computer system having a display device such as a monitor or LCD (liquid crystal display) screen for displaying information to the user and input devices by which the user can provide input to the computer system such as a keyboard, a two-dimensional pointing device such as a mouse or a trackball, or a three-dimensional pointing device such as a data glove or a gyroscopic mouse. The computer system can be programmed to provide a graphical user interface through which computer programs interact with users. The computer system can be programmed to provide a virtual reality, three-dimensional display interface, for use in some embodiments.

The present disclosure includes a number of appliance and system embodiments that include a number of ribs thereon. For example, embodiments can include a number of ribs for reinforcing the dental appliance regarding one or more forces (e.g., torsional, translational, and other types of force) as are discussed in more detail below.

For example, in various embodiments, the number of ribs can include a number of torsional reinforcing ribs for reinforcing the dental appliance regarding one or more torsional (i.e., twisting or rotational) forces. For instance, in some embodiments, the number of ribs includes a number of torsional reinforcing ribs that each provide reinforcing for the dental appliance regarding one or more torsional forces with respect to a line at the center of one of the number of apertures and elongate in a direction of a center of an adjacent tooth aperture.

As discussed above, embodiments can also be designed with respect to translational forces, such as side to side, front to back, back to front, up and down, and/or down and up with respect to the appliance shape and orientation. For example, in various embodiments, the number of ribs can include a number of perpendicular force reinforcing ribs for reinforcing the dental appliance regarding one or more forces perpendicular to a line at the center of one of the number of apertures and elongate in a direction of a center of an adjacent tooth aperture, among other forces. In some embodiments, the number of ribs includes a number of perpendicular force reinforcing ribs for reinforcing the dental appliance regarding one or more forces substantially perpendicular to a line at the center of one of the number of apertures and elongate in a direction of a center of an adjacent tooth aperture (e.g., the direction of elongation of the appliance).

Figure 7:
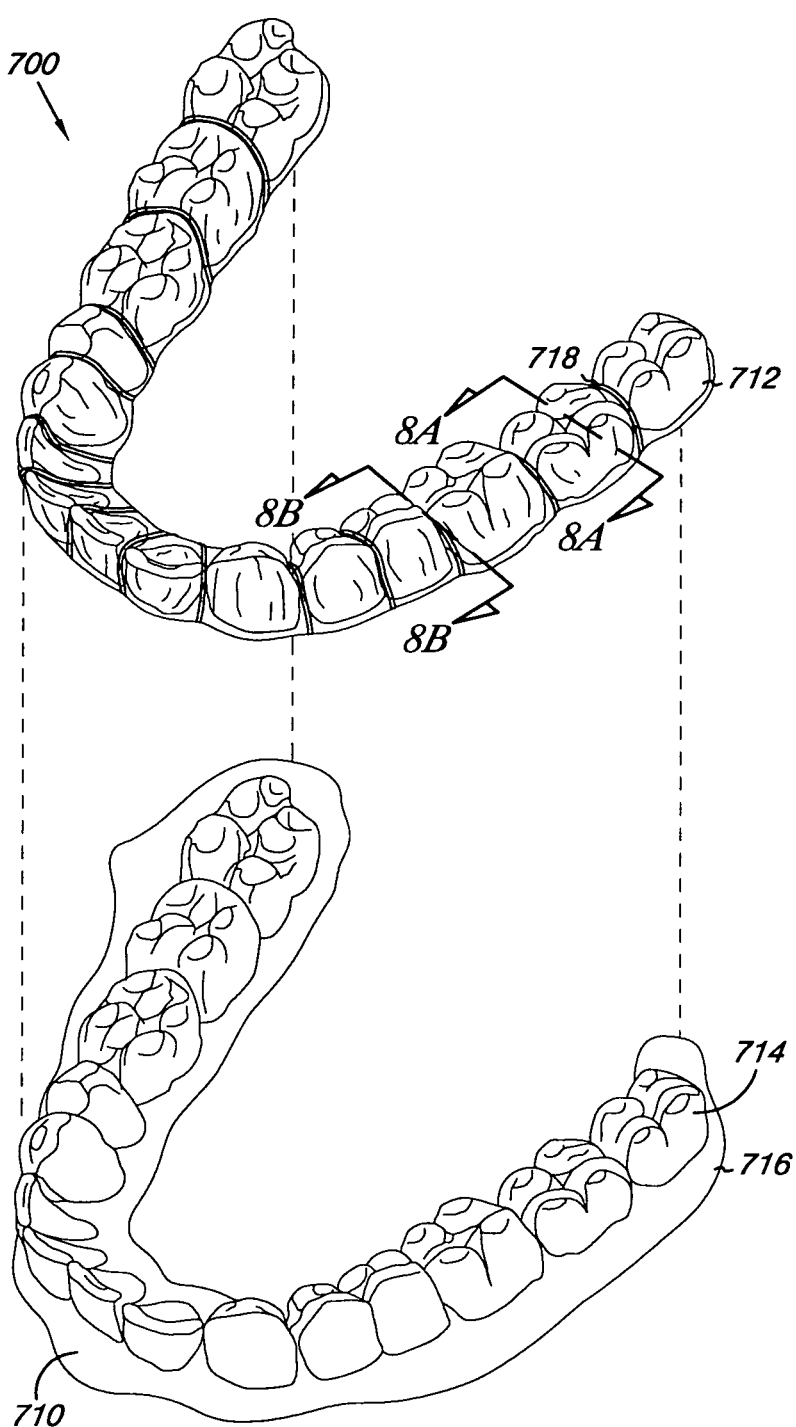
FIG. 7 illustrates an embodiment of an appliance and a set of teeth onto which the appliance is to be mounted.

FIG. 7 illustrates an embodiment of an appliance and a set of teeth onto which the appliance is to be mounted. In the embodiment of FIG. 7, the appliance 700 includes a number of apertures for the positioning of one or more teeth (e.g., teeth 714 on jaw 716 of patient 710) therein and a number of vertical ribs 718. As illustrated in FIG. 7, the number of tooth apertures can each include an interior surface and an exterior surface. In some embodiments one or more reinforcement ribs can be positioned along the exterior surface.

In various embodiments, the thickness of the ribs can vary from one portion of a rib to the next and/or can vary from one rib to the next. For example, in some embodiments, some ribs can be thicker where more force may be needed and thinner where less force may be needed. Additionally, although shown positioned in a spaced manner all along the length of elongation of the appliance, in some embodiments, the ribs can be positioned in one or more places along the length of the appliance rather than all along the length.

The ribs can have a number of sizes and/or shapes and can be sized and/or shaped differently from one portion of the rib to the next. In some embodiments, one or more of the ribs can be sized to not interfere with an interface surface of a dental appliance that is to abut a portion of the exterior surface of one of the number of tooth apertures.

In the embodiment of FIG. 7, the number of apertures each define an aperture for a single tooth, however, the embodiments of the present disclosure may have apertures to accommodate more than one tooth. Also, in the embodiment of FIG. 7, the number of ribs are each generally aligned vertically with respect to the direction of elongation of the appliance and are generally provided at or near the junction between apertures, however, the embodiments of the present disclosure may have ribs that are oriented horizontally or diagonally to the direction of elongation and/or are not positioned at or near the junctions between the apertures.

Figure 8A:
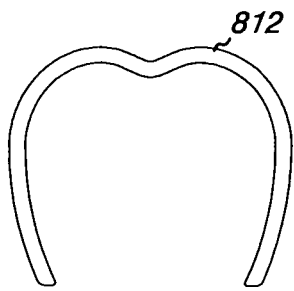
FIG. 8A illustrates an appliance thickness as taken along line 2A-2A of FIG. 7.
Figure 8B:
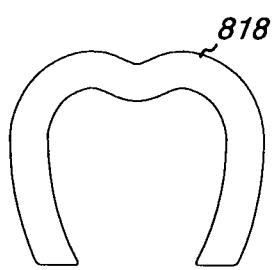
FIG. 8B illustrates an appliance thickness as taken along line 2B-2B of FIG. 7.

FIGS. 8A and 8B may aid in identifying one embodiment of a structure of a rib of an embodiment of the present disclosure. FIG. 8A illustrates an appliance thickness as taken along line 8A-8A of FIG. 7. This illustration provides a first thickness that in the embodiment of FIG. 7 provides the thickness for the majority of the appliance 812.

FIG. 8B illustrates an appliance thickness as taken along line 2B-2B of FIG. 7. This illustration provides a second thickness that in the embodiment of FIG. 7 provides the thickness for the ribs of the appliance 818. FIGS. 8A and 8B illustrate that the rib 818 has a thickness that is larger than the thickness of the 812.

Ribs can also be provided that have the same or smaller thickness than the other portions of the appliance. For example, a material or shape that is stiffer could be used as a rib material, in some embodiments, and may be thinner than the material used for other portions of the appliance.

As illustrated in the embodiment of FIG. 8B, at least a portion of one or more of the ribs can be positioned substantially vertically, along the height of the exterior surface of one of the number of tooth apertures. In some embodiments, one or more of the ribs can be positioned on the exterior surface of the dental appliance between two tooth apertures as is also illustrated in FIG. 8B.

In various embodiments, at least a portion of one or more of the ribs can be positioned, across a width of the exterior surface of one or more of the number of tooth apertures (e.g., along the outside surface of the appliance). In some embodiments, a rib can be positioned across the top of the aperture formed to accommodate a tooth (e.g., top portion of the U-shaped rib illustrated in FIG. 8B).

In some embodiments, at least a portion of one or more of the ribs can be positioned substantially vertically, along the height of the exterior surface of one or more of the number of tooth apertures (e.g., the side portions of the U-shaped rib illustrated in FIG. 8B) and/or across a top of the exterior surface of one or more of the number of tooth apertures (e.g., side portions and top portion of the U-shaped rib illustrated in FIG. 8B). In various embodiments, one or more of the ribs is positioned on the exterior surface of the dental appliance between two teeth apertures as illustrated in the embodiment of FIG. 8B.

FIG. 9 illustrates an appliance having inner and outer generally horizontal ribs according to an embodiment of the present disclosure. As stated above, appliances can have one or more vertical, diagonal, and/or horizontal ribs or rib portions in such orientations (e.g., ribs having non-linear shapes) and the one or more ribs can be positioned on the inside, top, and/or outside of the exterior surface of the appliance. As shown in FIG. 8B a rib can include portions that are in one or more of those positions on the appliance (e.g., inside, top, and outside).

As illustrated in the embodiment of FIG. 9, in various embodiments, at least a portion of one or more of the ribs can be positioned substantially laterally, across a length of at least one exterior surface of the number of tooth apertures. As illustrated in the embodiment of FIG. 9, in some embodiments, one or more of the ribs can be positioned to span across at least the exterior surfaces of more than one tooth apertures. Such embodiments can provide extra reinforcement in some embodiments due to the rib working with the force of a neighboring portion of the appliance and/or the tooth housed therein.

FIG. 10 illustrates an appliance cross-section illustrating the ribs as taken along line 10-10 of FIG. 9. The embodiment of FIG. 10 includes ribs 1022 provided at various positions on the exterior surface of the appliance 1012.

Ribs can be provided in various shapes. As illustrated in the embodiment of FIG. 10, a rib can have a semicircular cross-section among other cross-sectional shapes. Other cross-sectional shapes can include, for instance, circle, ellipse, polygon, or irregular based shapes, among others. The different shapes can provide different characteristics with regard to reinforcement and other benefits that ribs provide to an appliance. And, accordingly, ribs can have different shapes and sizes as discussed above and/or portions of ribs can have different shapes and sizes.

The present disclosure also includes a number of method embodiments. For example, in some embodiments a method includes forming a virtual teeth model of one or more of a patient's teeth on a computing device. The method also includes forming a virtual dental appliance based upon information from the virtual teeth model. Method embodiments can also include forming a number of ribs on the virtual dental appliance based upon the shape of the virtual dental appliance.

The number of ribs are formed based upon information about force that the dental appliance may experience in a patient's mouth.

An actual appliance to be positioned within a patient's mouth can be formed based upon the virtual dental appliance forming in the computing device. In some such embodiments, the appliance including the number of ribs can be formed using a rapid prototyping process, such as stereo lithography process, as discussed herein.

In various embodiments, the appliance can be formed using a rapid prototyping process and a number of ribs can be attached to the appliance. Such attachment can be accomplished, for example, by weaving the rib through a number of apertures formed in the appliance, by attaching the rib at two or more points along its length with an adhesive (e.g., a UV curable adhesive), or through a thermoforming process where multiple layers are pressed together with at least a portion of the rib material in between two of the layers, among other mechanisms for attaching the rib to the appliance.

In various embodiments, the one or more ribs can be attached to the mold used to make the appliance and then the rib can be used to provide a shape on the appliance. In such embodiments, the rib on the appliance would be a raised portion that is shaped in the form of the rib that was attached to the mold. This attachment to the mold can be accomplished in any suitable manner including, but not limited to, frictional attachment, physical attachment (e.g., weaving, a locking arrangement of parts, etc.), adhesive attachment, or other attachment mechanisms.

In some embodiments, the number of ribs can all be made from one material. In various embodiments, the ribs and the appliance can be formed from the same material. In some embodiments, the actual appliance and the number of ribs are formed from different materials.

Unless explicitly stated, the method embodiments described herein are not constrained to a particular order or sequence. Additionally, some of the described method embodiments, or elements thereof, can occur or be performed at the same, or at least substantially the same, point in time.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A dental appliance system, comprising:
   a series of dental appliances adapted to apply forces to a patient's teeth for moving the patient's teeth in accordance with a treatment path, the series of dental appliances including a first dental appliance associated with a first segment of the treatment path and a second dental appliance associated with a second segment of the treatment path, wherein each of the first and second dental appliances includes:
   a shell formed from a polymeric material having tooth apertures arranged in an arch shape based at least in part on the patient's dental arch, the shell comprising:
   at least one first arch-shaped rib integrally formed with the shell from the polymeric material and located on a lingual exterior surface of the shell, the at least one first arch-shaped rib following a contour of the lingual exterior surface of the shell along a first height of the shell; and
   at least one second arch-shaped rib integrally formed with the shell from the polymeric material and located on a labial exterior surface of the shell, the at least one second arch-shaped rib following a contour of the labial exterior surface of the shell along a second height of the shell different than the first height,
   wherein a thickness of the polymeric material of the shell at a location of the first arch-shaped rib or the second arch-shaped rib is larger than a thickness of the polymeric material of remaining portions of the shell that do not include the first or second arch-shaped rib;
   wherein the first and second arch-shaped ribs of the first dental appliance cooperate and are digitally modelled with the shell of the first dental appliance to determine and apply a first set of forces onto the patient's teeth to achieve a first pre-calculated displacement of the patient's teeth in accordance with the first segment of the treatment path, wherein the first and second arch-shaped ribs of the second dental appliance cooperate and are digitally modelled with the shell of the second dental appliance to determine and apply a second set of forces onto the patient's teeth to achieve a second pre-calculated displacement of the patient's teeth in accordance with the second segment of the treatment path, wherein the first pre-calculated displacement is different than the second pre-calculated displacement.

2. The dental appliance system of claim 1, wherein at least one of the first and second arch-shaped ribs is positioned on the lingual and labial exterior surfaces of the dental appliance between two tooth apertures.

3. The dental appliance system of claim 1, wherein at least part of the at least one of the first and second arch-shaped ribs is positioned laterally and across a width of the tooth apertures.

4. The dental appliance system of claim 1, wherein a first part of the at least one of the first and second arch-shaped ribs has a first shape, and a second part of the at least one of the first and second arch-shaped ribs has a second shape that is different than the first shape.

5. The dental appliance system of claim 4, wherein the first and second arch-shaped ribs are positioned on the lingual and labial exterior surfaces of the dental appliance between two teeth apertures.

6. The dental appliance system of claim 1, wherein at least one of the first and second arch-shaped ribs is sized to not interfere with an interface surface of the dental appliance that is to abut a portion of an exterior surface of one of the tooth apertures.

7. A dental appliance system, comprising:
a series of dental appliances adapted to apply forces to a patient's teeth for moving the patient's teeth in accordance with a treatment path, the series of dental appliances including a first dental appliance associated with a first segment of the treatment path and a second dental appliance associated with a second segment of the treatment path, wherein each of the first and second dental appliances includes:
a shell formed from a polymeric material and having a number of tooth apertures formed in an arch shape, the shell comprising:
a first arch-shaped rib integrally formed as part of the shell, the first arch-shaped rib following a contour of a lingual exterior surface of the shell along a first height of the dental appliance; and
a second arch-shaped rib integrally formed as part of the shell, the second arch-shaped rib follows a contour of a labial exterior surface of the shell along a second height of the dental appliance different than the first height,
wherein a thickness of the shell at a location of the first arch-shaped rib or the second arch-shaped rib is larger than a thickness of remaining portions of the dental appliance that do not include the first or second arch-shaped ribs; and
wherein the first and second arch-shaped ribs of the first dental appliance cooperate and are digitally modelled with the shell of the first dental appliance to determine and apply a first set of forces onto the patient's teeth to achieve a first pre-calculated displacement of the patient's teeth in accordance with the first segment of the treatment path, wherein the first and second arch-shaped ribs of the second dental appliance cooperate and are digitally modelled with the shell of the second dental appliance to determine and apply a second set of forces onto the patient's teeth to achieve a second pre-calculated displacement of the patient's teeth in accordance with the second segment of the treatment path, wherein the first pre-calculated displacement is different than the second pre-calculated displacement.

8. The dental appliance system of claim 7, wherein at least one of the first and second arch-shaped ribs includes a number of torsional reinforcing ribs for reinforcing the dental appliance regarding one or more torsional forces.

9. The dental appliance system of claim 7, further comprising one or more perpendicular force reinforcing ribs for reinforcing the dental appliance.

10. The dental appliance system of claim 7, wherein at least one of the first and second arch-shaped ribs includes a reinforcing rib that provides reinforcing for the dental appliance regarding one or more torsional forces or one or more forces perpendicular to a line defined by two points comprising a center of one of the number of tooth apertures and a center of an adjacent tooth aperture.

11. The dental appliance system of claim 7, wherein at least one of the first and second arch-shaped ribs has a semicircular cross-section.

12. The dental appliance system of claim 7, wherein at least one of the first and second arch-shaped ribs includes a number of lateral reinforcing ribs for reinforcing the dental appliance regarding one or more translational forces.

13. A dental appliance system, comprising:
a series of dental appliances adapted to apply forces to a patient's teeth for moving the patient's teeth in accordance with a treatment path, the series of dental appliances including a first dental appliance associated with a first segment of the treatment path and a second dental appliance associated with a second segment of the treatment path, wherein each of the first and second dental appliances includes:
a shell formed from a polymeric material and having tooth apertures formed in an arch shape for a placement of teeth therein, the shell comprising:
a first arch-shaped rib integrally formed from the polymeric material on a lingual exterior surface of the shell and configured to reinforce the shell, and
a second arch-shaped rib integrally formed from the polymeric material on a labial exterior surface of the shell and configured to reinforce the shell, wherein a thickness of the shell at a location of the first arch-shaped rib or the second arch-shaped rib is larger than a thickness of remaining portions of the shell that do not include the first or second arch-shaped ribs, wherein the first arch-shaped rib follows a contour of the lingual exterior surface along a first height of the shell, and wherein the second arch-shaped rib follows a contour of the labial exterior surface along a second height of the shell different than the first height; and
wherein the first and second arch-shaped ribs of the first dental appliance cooperate and are digitally modelled with the shell of the first dental appliance to determine and apply a first set of forces onto the patient's teeth to achieve a first pre-calculated displacement of the patient's teeth in accordance with the first segment of the treatment path, wherein the first and second arch-shaped ribs of the second dental appliance cooperate and are digitally modelled with the shell of the second dental appliance to determine and apply a second set of forces onto the patient's teeth to achieve a second pre-calculated displacement of the patient's teeth in accordance with the second segment of the treatment path, wherein the first pre-calculated displacement is different than the second pre-calculated.

14. The dental appliance system of claim 1, wherein the at least one of the first and second arch-shaped ribs includes a semicircle cross-section.

15. The dental appliance system of claim 1, wherein one of the first and second arch-shaped ribs is positioned around a rim of the shell and is adapted to be positioned around a gum line of the patient.

* * * * *